US012589572B2

(12) United States Patent
Nitta et al.

(10) Patent No.: US 12,589,572 B2
(45) Date of Patent: Mar. 31, 2026

(54) DEVICE FOR DETECTING PAPER SPLICE PART OF CARDBOARD SHEET, AND DEVICE FOR PRODUCING CARDBOARD SHEET

(71) Applicant: MITSUBISHI HEAVY INDUSTRIES MACHINERY SYSTEMS, LTD., Hyogo (JP)

(72) Inventors: Takashi Nitta, Hyogo (JP); Shuichi Takemoto, Hyogo (JP); Junichi Kawase, Hyogo (JP); Kazuki Mizushima, Hyogo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 170 days.

(21) Appl. No.: 18/268,257

(22) PCT Filed: Dec. 20, 2021

(86) PCT No.: PCT/JP2021/047052

§ 371 (c)(1),
(2) Date: Jun. 19, 2023

(87) PCT Pub. No.: WO2022/138570

PCT Pub. Date: Jun. 30, 2022

(65) Prior Publication Data

US 2024/0051253 A1 Feb. 15, 2024

(30) Foreign Application Priority Data

Dec. 25, 2020 (JP) ................................ 2020-216553

(51) Int. Cl.
*B31F 1/28* (2006.01)
*B65H 20/02* (2006.01)
*B65H 21/00* (2006.01)

(52) U.S. Cl.
CPC .......... *B31F 1/2831* (2013.01); *B31F 1/2818* (2013.01); *B31F 1/285* (2013.01);
(Continued)

(58) Field of Classification Search
CPC ............................. B31F 1/2831; B31F 1/2818
See application file for complete search history.

(56) References Cited

U.S. PATENT DOCUMENTS 4,901,577 A 2/1990 Roberts
5,459,538 A * 10/1995 Petry, Jr. ................ G03D 15/10 53/520

(Continued)

FOREIGN PATENT DOCUMENTS

JP H01161026 U 11/1989
JP 2002192636 A 7/2002

(Continued)

OTHER PUBLICATIONS https://www.farnell.com/datasheets/705584.pdf (Year: 2009).*

(Continued)

*Primary Examiner* — Nicholas Krasnow
(74) *Attorney, Agent, or Firm* — HAUPTMAN HAM, LLP

(57) ABSTRACT

In a device for detecting a paper splice part of a cardboard sheet and a device for producing a cardboard sheet, the device for detecting a paper splice part of a cardboard sheet, which detects a sheet paper splice part of a cardboard sheet that has a first sheet, a corrugated second sheet, and a third sheet bonded together, comprises: a sheet paper splice detection unit that detects the sheet paper splice part on the basis of the shape of the sheet and that is placed between a position at which sheets are spliced and a position at which the sheets are bonded in a sheet carrying direction; a marking device that marks the sheet paper splice part on the (Continued)

downstream side of the sheet paper splice detection unit in the sheet carrying direction; and a mark detection device that detects the mark on the downstream side of the marking device in the sheet carrying direction.

5 Claims, 15 Drawing Sheets

(52) U.S. Cl.
CPC ............. *B65H 20/02* (2013.01); *B65H 21/00* (2013.01); *B65H 2301/46017* (2013.01); *B65H 2301/46152* (2013.01); *B65H 2511/13* (2013.01); *B65H 2701/176* (2013.01)

(56) References Cited

U.S. PATENT DOCUMENTS

| | | | | |
|---|---|---|---|---|
| 2010/0163154 | A1* | 7/2010 | Masuda | B31F 1/2831 156/64 |
| 2018/0079162 | A1 | 3/2018 | Adami | |
| 2019/0377297 | A1* | 12/2019 | Kent | G03G 15/652 |
| 2020/0118262 | A1* | 4/2020 | Takemoto | B31F 1/2813 |
| 2020/0331280 | A1* | 10/2020 | Koloditsky | B65H 43/04 |
| 2022/0185619 | A1* | 6/2022 | Barcellos Ramos | G01N 21/8851 |
| 2024/0101382 | A1* | 3/2024 | Perini | B65H 19/12 |
| 2024/0101383 | A1* | 3/2024 | Perini | B65H 19/123 |
| 2024/0140749 | A1* | 5/2024 | Perini | B65H 19/123 |

FOREIGN PATENT DOCUMENTS

| | | | |
|---|---|---|---|
| JP | 2009045910 | A | 3/2009 |
| JP | 2009113895 | A | 5/2009 |
| JP | 2010105772 | A | 5/2010 |
| JP | 2010214673 | A | 9/2010 |
| JP | 2013202916 | A | 10/2013 |
| JP | 2018002341 | A | 1/2018 |

OTHER PUBLICATIONS

R58 Registration Mark Sensors Provide High-Speed, Low-Contrast Sensitivity https://info.bannerengineering.com/cs/groups/public/documents/literature/128094.pdf (Year: 0).*

International Search Report and written Opinion of International Application No. PCT/JP2021/047052 mailed Feb. 22, 2022; 16pp.

* cited by examiner

DEVICE FOR DETECTING PAPER SPLICE PART OF CARDBOARD SHEET, AND DEVICE FOR PRODUCING CARDBOARD SHEET

RELATED APPLICATIONS

The present application is a National Phase of International Application Number PCT/JP2021/047052 filed Dec. 20, 2021, and claims priority of Japanese Application Number 2020-216553 filed Dec. 25, 2020.

TECHNICAL FIELD

The present disclosure relates to a paper splice part detection device of a cardboard sheet, which detects a splice part of a cardboard sheet in which a bottom liner, a corrugated medium, and a top liner are bonded, and a cardboard sheet-manufacturing apparatus including a paper splice part detection device of a cardboard sheet.

BACKGROUND ART

A corrugating machine as a cardboard sheet-manufacturing apparatus includes a single facer and a double facer. The single facer processes a medium into a corrugated shape, and bonds a top liner to form a single-faced cardboard sheet. The double facer bonds a bottom liner to the single-faced cardboard sheet to form a double-faced cardboard sheet. The continuous double-faced cardboard sheet manufactured by the double facer is cut into a predetermined width by a slitter scorer, and is cut into a predetermined length by a cutoff device so that a cardboard sheet is manufactured.

The bottom liner, the medium, and the top liner are sheets supplied from a roll paper held in each mill roll stand. The mill roll stand holds a plurality of the roll papers. When the roll paper is left a little while the sheet is supplied, the sheet of the roll paper on standby is spliced by a splicer so that the sheet can be continuously fed. However, a paper splice part of the sheet is treated as a defective part which cannot be used as a product. Accordingly, it is necessary to detect, cut, and remove the paper splice part when the cardboard sheet is manufactured.

In the related art, a metal plate such as aluminum is bonded to the paper splice part of the sheet, and the paper splice part is detected via the metal plate by a metal sensor. However, when the sheet meanders while the sheet is transferred, the metal sensor cannot detect the metal plate, thereby causing a possibility that the paper splice part may be shipped as a product together with the metal plate. For example, in order to solve this problem, PTL 1 below discloses a solution. According to a paper splice part detection device of a cardboard sheet disclosed in PTL 1, a position of a paper splice part of a sheet is calculated, based on a paper splice signal output by a splicer, a mark is assigned to the paper splice part, and the detection device detects the mark of the cardboard sheet to cut and remove the paper splice part.

CITATION LIST

Patent Literature

[PTL 1] Japanese Unexamined Patent Application Publication No. 2018-2341

SUMMARY OF INVENTION

Technical Problem

In PTL 1 described above, the position of the paper splice part of the sheet is calculated, based on the paper splice signal output by the splicer. However, when the progressively supplied sheet and the sheet of the roll paper on standby are connected by the splicer, a supply speed of the progressively supplied sheet is lowered, and a stagnating sheet is fed by moving a dancer roll. At this time, accuracy in position calculation processing of the paper splice part based on the paper splice signal may vary. Therefore, many cardboard sheets are removed as defective sheets in accordance with variations in position accuracy of the paper splice part based on the paper splice signal, thereby causing a problem in that the number of defective sheets increases.

In addition, a single-faced cardboard sheet having a predetermined length stagnates between a single facer outlet and a predetermined position on an upstream side of a double facer (hereinafter, referred to as a bridge stagnation quantity). Then, the bridge stagnation quantity is calculated, based on a position of the paper splice part. However, when the accuracy in the position calculation processing of the paper splice part varies, there is a problem that a length of the bridge stagnation quantity cannot be accurately calculated.

The present disclosure solves the above-described problems, and an object of the present invention is to provide a paper splice part detection device of a cardboard sheet and a cardboard sheet-manufacturing apparatus which improve accuracy in detecting a paper splice part of a cardboard sheet without using a metal plate such as aluminum.

Solution to Problem

According to the present disclosure, in order to achieve the above-described object, there is provided a paper splice part detection device of a cardboard sheet, which detects a sheet paper splice part in a cardboard sheet in which a first sheet, a corrugated second sheet, and a third sheet are bonded. The device includes a sheet paper splice detection unit disposed between a sheet paper splicing position and a sheet bonding position in a sheet transfer direction and detecting the sheet paper splice part, based on a shape of the sheet, a marking device that assigns a mark to the sheet paper splice part on a downstream side in the sheet transfer direction from the sheet paper splice detection unit, and a mark detection device that detects the mark on the downstream side in the sheet transfer direction from the marking device.

In addition, according to the present disclosure, there is provided a cardboard sheet-manufacturing apparatus in which a first sheet, a corrugated second sheet, and a third sheet are bonded to manufacture a cardboard sheet. The apparatus includes a splicing device that splices a trailing sheet to a leading sheet in the first sheet, the second sheet, and the third sheet, a single facer that manufactures a single-faced cardboard sheet by bonding the corrugated second sheet to the third sheet, a double facer that manufactures a double-faced cardboard sheet by bonding the first sheet to the second sheet side in the single-faced cardboard sheet, the paper splice part detection device of the cardboard sheet, and a sheet removal device that removes a paper splice part detected by the paper splice part detection device of a cardboard sheet from a transfer line.

In addition, according to the present disclosure, there is provided a cardboard sheet-manufacturing apparatus in which a first sheet, a corrugated second sheet, and a third sheet are bonded to manufacture a cardboard sheet. The apparatus includes a splicing device that splices a trailing sheet to a leading sheet in the first sheet, the second sheet, and the third sheet, a single facer that manufactures a single-faced cardboard sheet by bonding the corrugated second sheet to the third sheet, a double facer that manufactures a double-faced cardboard sheet by bonding the first sheet to the second sheet side in the single-faced cardboard sheet, the paper splice part detection device of a cardboard sheet, and a bridge stagnation quantity measurement unit that measures a stagnation quantity of the single-faced cardboard sheet, based on a paper splice part detected by the paper splice part detection device of the cardboard sheet.

Advantageous Effects of Invention

According to the paper splice part detection device of a cardboard sheet and the cardboard sheet-manufacturing apparatus in the present disclosure, it is possible to improve accuracy in detecting the paper splice part of the cardboard sheet without using a metal plate such as aluminum.

DESCRIPTION OF EMBODIMENTS

Hereinafter, a preferred embodiment of the present disclosure will be described in detail with reference to the drawings. The present disclosure is not limited by the embodiment, and in a case where there are a plurality of embodiments, the present disclosure also includes a configuration in which the respective embodiments are combined with each other. In addition, configuration elements in the embodiment include those which can be easily assumed by those skilled in the art, those which are substantially the same, and those which have a so-called equivalent scope.

[Corrugating Machine]

Figure 1:
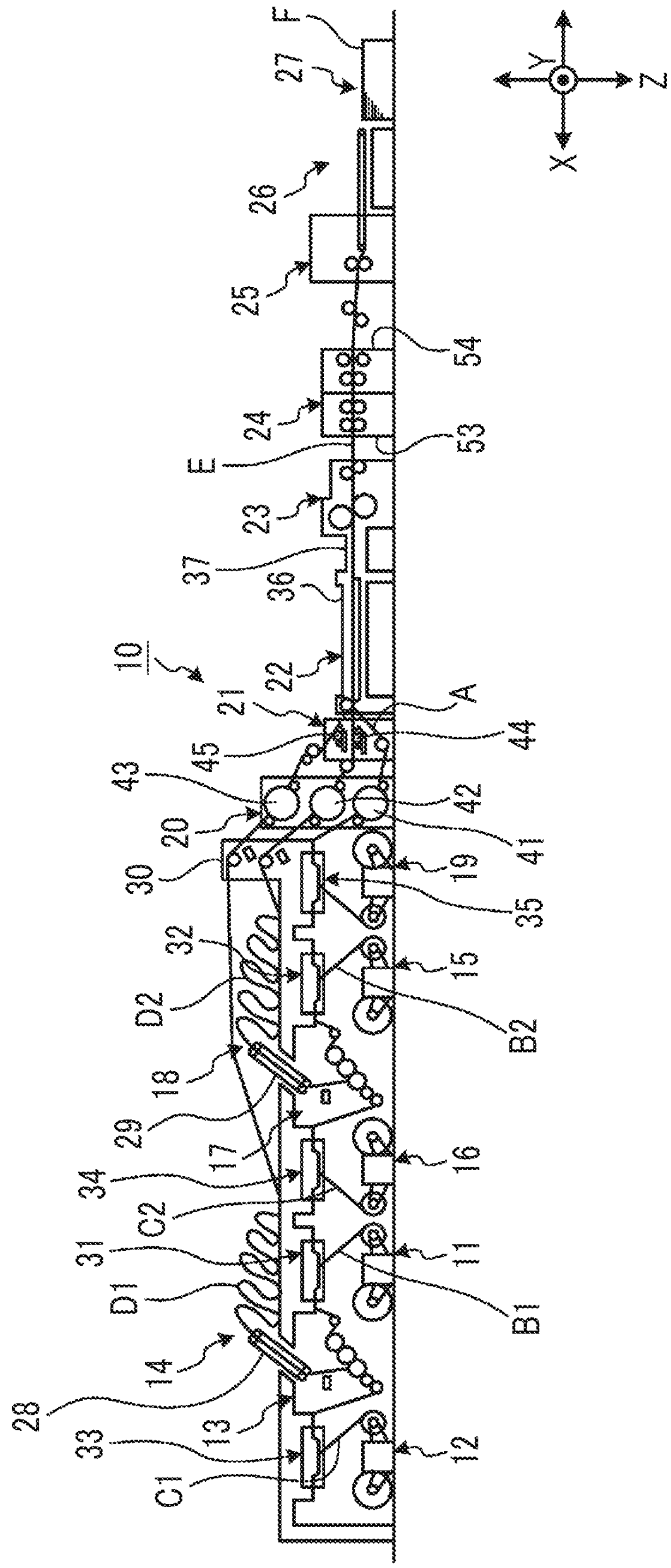
FIG. 1 is a schematic view illustrating a corrugating machine of the present embodiment.

FIG. 1 is a schematic view illustrating a corrugating machine serving as a cardboard sheet-manufacturing apparatus according to the present embodiment. In the following description, a longitudinal direction of the corrugating machine will be referred to as an X-direction, a horizontal direction orthogonal to the longitudinal direction (X-direction) of the corrugating machine will be referred to as a Y-direction (width direction of a cardboard sheet), and a vertical direction (thickness direction of the cardboard sheet) orthogonal to the longitudinal direction (X-direction) of the corrugating machine will be referred to as a Z-direction. In addition, a first sheet of the present invention corresponds to a bottom liner A, a second sheet corresponds to media B1 and B2, and a third sheet corresponds to top liners C1 and C2.

As illustrated in FIG. 1, first, a corrugating machine 10 serving as the cardboard sheet-manufacturing apparatus manufactures a single-faced cardboard sheet D1 by bonding the top liner C1 to the corrugated medium B1 to, and manufactures a single-faced cardboard sheet D2 by bonding the top liner C2 to the corrugated medium B2. Next, the top liner C2 of the single-faced cardboard sheet D2 is bonded to the medium B1 of the manufactured single-faced cardboard sheet D1, and the bottom liner A is bonded to the medium B2 of the single-faced cardboard sheet D2 to manufacture a continuous double-faced cardboard sheet E. Then, the continuous double-faced cardboard sheet E is cut into a predetermined length to manufacture a plate-shaped double-faced cardboard sheet F.

The corrugating machine 10 can manufacture the double-faced cardboard sheet by bonding the single-faced cardboard sheet D2 or the single-faced cardboard sheet D1 and the bottom liner A. In addition, the corrugating machine 10 can manufacture a double wall corrugated cardboard sheet by bonding the single-faced cardboard sheet D1, the single-faced cardboard sheet D2, and the bottom liner A. Therefore, in the following description, the double-faced cardboard sheet and the double wall corrugated cardboard sheet will be collectively referred to as a double-faced cardboard sheet E. In addition, a plate-shaped double-faced cardboard sheet and a plate-shaped double wall corrugated cardboard sheet will be collectively referred to as a double-faced cardboard sheet F.

The corrugating machine 10 includes a mill roll stand 11 of the medium B1, a mill roll stand 12 of the top liner C1, a single facer 13, a bridge 14, and a mill roll stand 15 of the medium B2, a mill roll stand 16 of the top liner C2, a single facer 17, a bridge 18, a mill roll stand 19 of the bottom liner A, a preheater 20, a glue machine 21, a double facer 22, a rotary shear 23, a slitter scorer 24, a cutoff 25, a defective sheet rejecting device 26, and a stacker 27.

Roll papers in which the media B1 and B2 are respectively wound in a roll shape around both sides in the X-direction are mounted on the mill roll stands 11 and 15, and splicers 31 and 32 for splicing the roll papers are provided between the respective roll papers. When one roll paper is fed, the other roll paper is mounted thereon to prepare splicing. When one roll paper is left a little, the splicers 31 and 32 splice the other roll paper to the one roll paper. Therefore, the media B1 and B2 are continuously fed toward a downstream side from the respective mill roll stands 11 and 15.

Roll papers in which the top liners C1 and C2 are respectively wound in a roll shape around both sides in the X-direction are mounted on the mill roll stands 12 and 16, and splicers 33 and 34 for splicing the roll papers are provided between the respective roll papers. When one roll paper is fed, the other roll paper is mounted thereon to prepare splicing. When one roll paper is left a little, the splicers 33 and 34 splice the other roll paper to the one roll paper. Therefore, the top liners C1 and C2 are continuously fed toward the downstream side from the respective mill roll stands 12 and 16.

The media B1 and B2 fed from the mill roll stands 11 and 15 and the top liners C1 and C2 fed from the mill roll stands 12 and 16 are respectively preheated by preheaters (not illustrated). The respective preheaters have a heating roll into which steam is supplied, and the media B1 and B2 and the top liners C1 and C2 are transferred by being wound around the heating roll so that all of these are heated up to a predetermined temperature.

The single facer 13 processes the heated medium B1 into a corrugated shape, and thereafter, the medium B1 is glued to each flute top. The heated top liner C1 is bonded thereto to form the single-faced cardboard sheet D1. The single facer 13 is provided with a take up conveyor 28 in an outlet part of the single-faced cardboard sheet D1, and transfers the single-faced cardboard sheet D1 formed by the single facer 13 to the bridge 14. In order to absorb a speed difference between the single facer 13 and the double facer 22, the bridge 14 causes the single-faced cardboard sheet D1 to temporarily stagnate.

The single facer 17 processes the heated medium B2 into a corrugated shape, and thereafter, the medium B2 is glued to each flute top. The heated top liner C2 is bonded thereto to form the single-faced cardboard sheet D2. The single facer 17 is provided with a take up conveyor 29 in an outlet part of the single-faced cardboard sheet D2, and transfers the single-faced cardboard sheet D2 formed by the single facer 17 to the bridge 18. In order to absorb a speed difference between the single facer 17 and the double facer 22, the bridge 18 causes the single-faced cardboard sheet D2 to temporarily stagnate.

In addition, the paper guide device 30 is provided in outlet parts of the bridge 14 and the bridge 18. The paper guide device 30 adjusts positions of the single-faced cardboard sheet D1 and the single-faced cardboard sheet D2 in the Y-direction between the bridge 14 and the bridge 18 and the double facer 22.

Roll papers in which the bottom liners A are respectively wound in a roll shape around both sides are mounted on the mill roll stand 19, and a splicer 35 for splicing the roll paper is provided between the respective roll papers. When one roll paper is fed, the other roll paper is mounted thereon to prepare splicing. When one roll paper is left a little, the splicer splices the other roll paper to the one roll paper. Therefore, the bottom liner A is continuously fed toward the downstream side from the mill roll stand 19.

In the preheater 20, three preheating rolls 41, 42, and 43 are aligned in the Z-direction. The preheating roll 41 heats the bottom liner A, the preheating roll 42 heats the single-faced cardboard sheet D2, and the preheating roll 43 heats the single-faced cardboard sheet D1. The respective preheating rolls 41, 42, and 43 have a winding amount adjustment device (not illustrated), and steam is internally supplied thereto to be heated up to a predetermined temperature. The bottom liner A, the single-faced cardboard sheet D2, and the single-faced cardboard sheet D1 are wound around a peripheral surface thereof. In this manner, all of these are preheated.

In the glue machine 21, adhesive applicator rolls 44 and 45 are aligned in the Z-direction. The adhesive applicator roll 44 comes into contact with and glues each flute top of the medium B2 in the single-faced cardboard sheet D2 heated by the preheating roll 42. The adhesive applicator roll 45 comes into contact with and glues each flute top of the medium B1 in the single-faced cardboard sheet D1 heated by the preheating roll 43. The single-faced cardboard sheets D1 and D2 glued by the glue machine 21 are transferred to the double facer 22 for a subsequent step. The bottom liner A heated by the preheating roll 41 is also transferred to the double facer 22 through the inside of the glue machine 21.

The double facer 22 includes an upstream-side heating section 36 and a downstream-side cooling section 37 along traveling lines of the respective single-faced cardboard sheets D1 and D2 and the bottom liner A. The single-faced cardboard sheets D1 and D2 and the bottom liner A which are glued by the glue machine 21 are carried between a pressurizing belt and a heating plate in the heating section 36, and are integrated and transferred toward the cooling section 37 in a state of overlapping each other. During the transfer, the respective single-faced cardboard sheets D1 and D2 and the bottom liner A are heated while being pressurized. In this manner, all of these are bonded to form the continuous double-faced cardboard sheet E. Thereafter, all of these are naturally cooled while being transferred.

The double-faced cardboard sheet E manufactured by the double facer 22 is transferred to the slitter scorer 24. The slitter scorer 24 cuts the wide double-faced cardboard sheet E along the X-direction to have a predetermined width, and processes a creasing line extending in the X-direction. The slitter scorer 24 is configured to include a first slitter scorer unit 53 and a second slitter scorer unit 54 which have substantially the same structure arrayed along the X-direction of the double-faced cardboard sheet E. The wide double-faced cardboard sheet E is cut by the slitter scorer 24 to form the double-faced cardboard sheet E having a predetermined width.

The cutoff 25 cuts the double-faced cardboard sheet E cut in the X-direction by the slitter scorer 24 along the Y-direction, and forms the plate-shaped double-faced cardboard sheet F having a predetermined length. The defective sheet rejecting device 26 rejects the double-faced cardboard sheet F determined as a defective sheet by a defect detection device (to be described later) from a transfer line. Although not illustrated, the defective sheet rejecting device 26 includes a discharge conveyor and a sorting roll. When the plate-shaped double-faced cardboard sheet F determined as the defective sheet is transferred, the sorting roll descends to sort and reject the plate-shaped double-faced cardboard sheet F of the defective sheet to the discharge conveyor. The stacker 27 stacks the double-faced cardboard sheets F determined as quality sheets, and discharges the double-faced cardboard sheets F out of the apparatus, as products.

[Rough Configuration of Paper Splice Part Detection Device]

Figure 2:
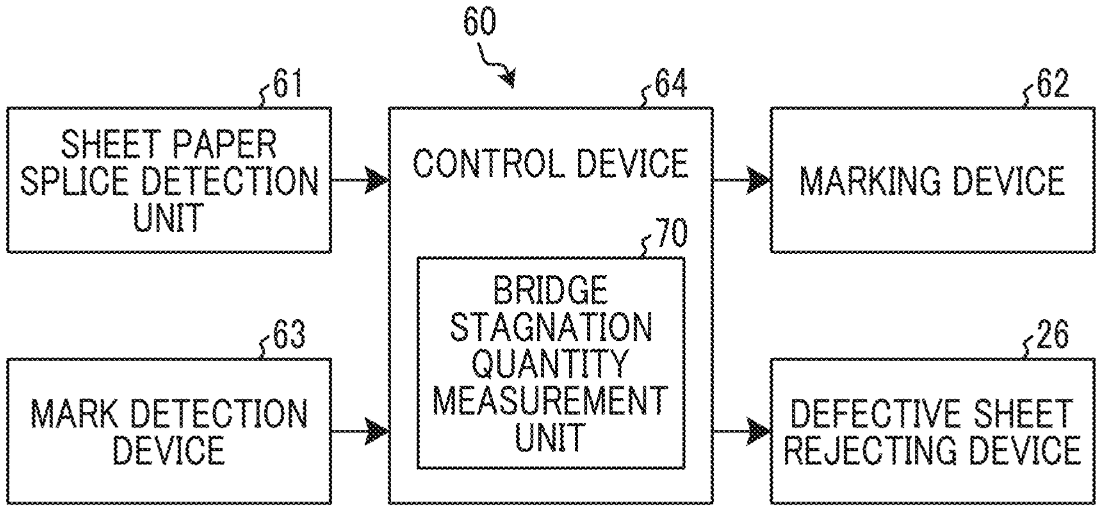
FIG. 2 is a schematic configuration diagram illustrating a paper splice part detection device of a cardboard sheet of the present embodiment.

Here, a paper splice part detection device of a cardboard sheet of the present embodiment will be described. FIG. 2 is a schematic configuration diagram illustrating the paper splice part detection device of a cardboard sheet of the present embodiment, and FIG. 3 is a schematic configuration diagram illustrating a processing flow in the paper splice part detection device of a cardboard sheet of the present embodiment.

As illustrated in FIG. 2, the paper splice part detection device 60 of a cardboard sheet detects a sheet paper splice part in the double-faced cardboard sheet E in which the bottom liner A, the corrugated media B1 and B2, and the top liners C1 and C2 are bonded. The paper splice part detection device 60 of a cardboard sheet includes a sheet paper splice detection unit 61, a marking device 62, a mark detection device 63, and a control device 64.

The sheet paper splice detection unit 61 is disposed between a sheet paper splicing position and a sheet bonding position in a sheet transfer direction (one in the X-direction). The sheet paper splice detection unit 61 detects a sheet paper splice part, based on a sheet shape. Specifically, the sheet paper splice detection unit 61 detects the sheet paper splice part, based on a sheet thickness. The marking device 51 assigns a mark to the sheet paper splice part on the downstream side in the sheet transfer direction from the sheet paper splice detection unit 61. The mark detection device 63 detects the mark on the downstream side in the sheet transfer direction from the marking device 62. The control device 64 controls an operation timing of the marking device 62, based on a detection result of the sheet paper splice detection unit 61. In addition, the control device 64 controls an operation timing of the defective sheet rejecting device (sheet removal device) 26, based on position information of the mark detected by the mark detection device 63.

Figure 3:
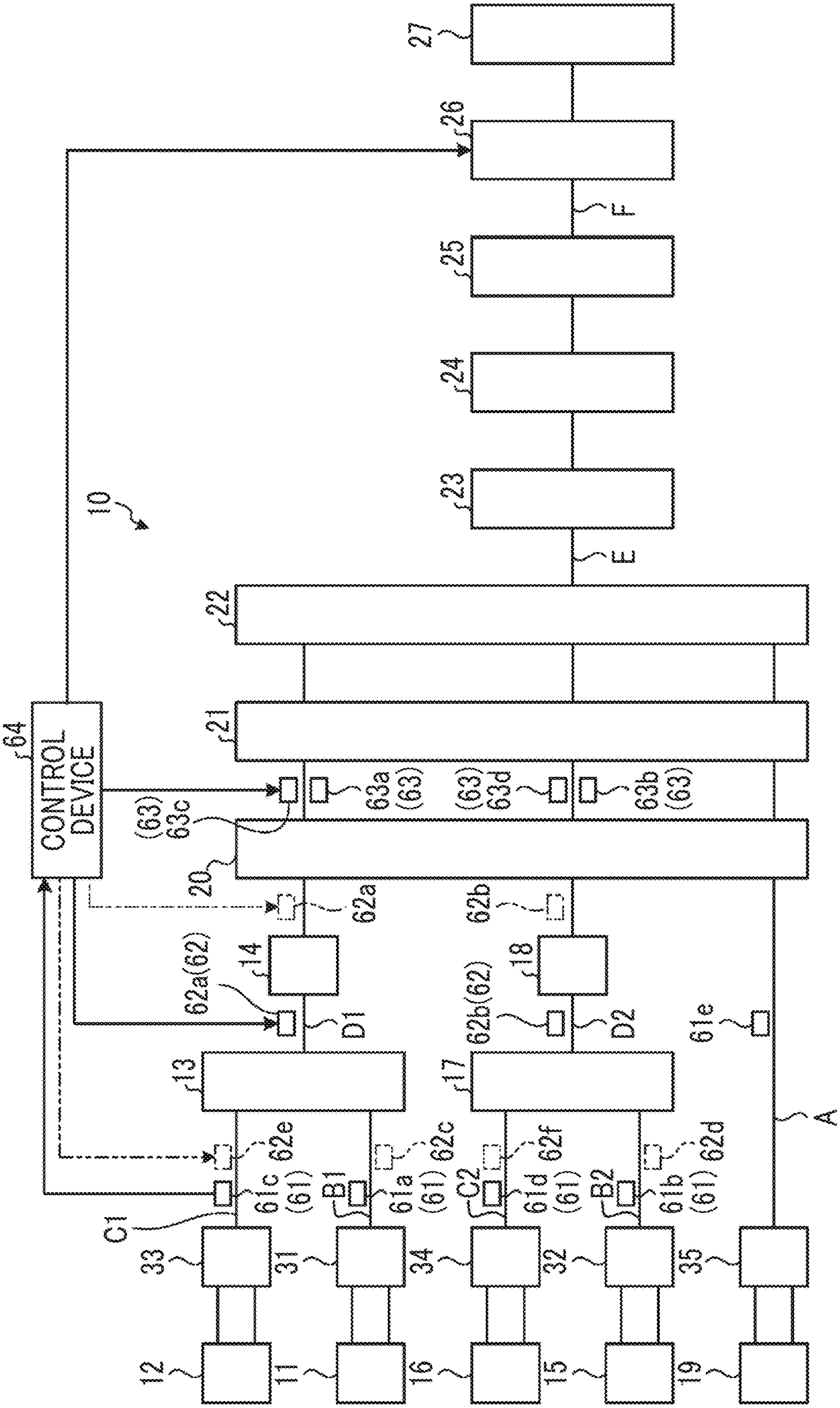
FIG. 3 is a schematic configuration diagram illustrating a processing flow in the paper splice part detection device of the cardboard sheet of the present embodiment.

As illustrated in FIGS. 2 and 3, the sheet paper splice detection unit 61 detects each sheet paper splice part of the bottom liner A, the media B1 and B2, and the top liners C1 and C2. The media B1 and B2 are fed from the mill roll stands 11 and 15, and are transferred to the single facers 13 and 17 through the splicers 31 and 32. The top liners C1 and C2 are fed from the mill roll stands 12 and 16, and are transferred to the single facers 13 and 17 through the splicers 33 and 34. The sheet paper splice detection unit 61 is configured to include five ultrasonic sensors 61*a*, 61*b*, 61*c*, 61*d*, and 61*e*. The ultrasonic sensors 61*a*, 61*b*, 61*c*, and 61*d* are disposed between the splicers 31, 32, 33, and 34 and the single facers 13 and 17. In addition, the ultrasonic sensor 61*e* is disposed between the splicer 35 and the preheater 20. The ultrasonic sensors 61*a*, 61*b*, 61*c*, 61*d*, and 61*e* output detection results to the control device 64.

Figure 4:
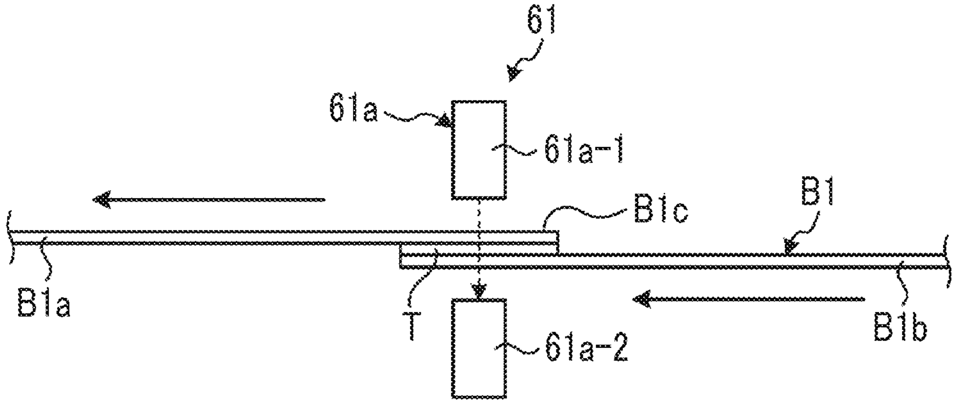
FIG. 4 is a schematic view illustrating a sheet paper splice detection unit.

FIG. 4 is a schematic view illustrating the sheet paper splice detection unit. As illustrated in FIG. 4, for example, in the medium B1, a rear end portion of a leading paper B1*a* and a tip portion of a trailing paper B1*b* are connected by a paper splice part B1*c*. The paper splice part B1*c* is connected so that a lower surface of the rear end portion of the leading paper B1*a* and an upper surface of the tip portion of the trailing paper B1*b* overlap each other with a double-faced tape T. Therefore, a thickness of the paper splice part B1*c* is a total sum of the thickness of the leading paper B1*a*, the thickness of the trailing paper B1*b*, and the thickness of the double-faced tape T. The thickness of the paper splice part B1*c* is thicker than the thickness of the leading paper B1*a* and the thickness of the trailing paper B1*b*. The ultrasonic sensor 61*a* includes a transmitting unit 61*a*-1 and a receiving unit 61*a*-2. The transmitting unit 61*a*-1 is disposed on an upper surface side of the transferred medium B1, and the receiving unit 61*a*-2 is disposed on a lower surface side of the transferred medium B1 to face the transmitting unit 61*a*-1.

The transmitting unit 61*a*-1 transmits ultrasonic waves toward the medium B1, and the receiving unit 61*a*-2 receives the ultrasonic waves transmitted through the medium B1. At this time, the ultrasonic waves transmitted from the transmitting unit 61*a*-1 are attenuated when passing through the medium B1, and the attenuated ultrasonic waves are received by the reception unit 61*a*-2. In the medium B1, the thickness of the paper splice part B1*c* is thicker than the thickness of the leading paper B1*a* and the trailing paper B1*b*. Therefore, in the medium B1, the amount of attenuation of the ultrasonic waves in the paper splice part B1*c* is larger than the amount of attenuation of the ultrasonic waves in the leading paper B1*a* and the trailing paper B1*b*. The ultrasonic sensor 61*a* outputs a level of the ultrasonic waves received by the receiving unit 61*a*-2 to the control device 64. The control device 64 detects the paper splice part B1*c*, based on the level of the ultrasonic waves input from the ultrasonic sensor 61*a*. That is, the level of the ultrasonic waves transmitted through the leading paper B1*a* and the trailing paper B1*b* is measured in advance, and the level of the ultrasonic waves transmitted through the paper splice part B1*c* is measured. A threshold value (determination value) between the level of the ultrasonic waves transmitted through the leading paper B1*a* and the trailing paper B1*b* and the level of the ultrasonic waves transmitted through the paper splice part B1*c* is set. Then, the control device 64 detects the paper splice part B1*c* by comparing the level of the ultrasonic waves input from the ultrasonic sensor 61*a* with the determination value.

The sheet paper splice detection unit 61 is not limited to a configuration including the ultrasonic sensors 61*a*, 61*b*, 61*c*, 61*d*, and 61*e*. For example, the sheet paper splice detection unit 61 may be configured to include a laser displacement sensor. That is, the laser displacement sensor is disposed on the upper surface side or the lower surface side of the transferred medium B1. The paper splice part B1*c* has a step difference from the leading paper B1*a* or the trailing paper B1*b*. Therefore, in the medium B1, a distance to the leading paper B1*a* and a distance to the trailing paper B1*b* from the laser displacement sensor are different from each other. In the control device 64, a time until a laser is reflected and returned after being transmitted toward the leading paper B1*a* by the laser displacement sensor, and a time until a laser is reflected and returned after being transmitted toward the trailing paper B1*b* by the laser displacement sensor are compared with each other to detect a sheet step difference. In this manner, the paper splice part B1*c* is detected, based on a position on the sheet step difference.

As illustrated in FIGS. 2 and 3, the marking device 62 is controlled by the control device 64. The control device 64 operates the marking device 62 to assign a mark to each position of the sheet paper splice parts in the media B1 and B2 and the top liners C1 and C2 which are detected by the sheet paper splice detection unit 61. The marking device 62 is configured to include two crushing rollers 62*a* and 62*b*. The crushing rollers 62*a* and 62*b* are disposed between the single facers 13 and 17 and the bridges 14 and 18 on the downstream side in the sheet transfer direction from the ultrasonic sensors 61*a*, 61*b*, 61*c*, and 61*d*. The two crushing rollers 62*a* and 62*b* serving as the marking device 62 may be disposed between the bridges 14 and 18 and the preheater 20.

The crushing roller 62*a* is disposed to be pivotable at a position away from the top liner C1 forming the single-faced cardboard sheet D1 by a predetermined distance. The crushing roller 62*a* moves closer to the single-faced cardboard sheet D1, and crushes the medium B1 in the single-faced cardboard sheet D1 to form a crushed portion as the mark.

In addition, the crushing roller 62*b* is disposed to be pivotable at a position away from the top liner C2 forming the single-faced cardboard sheet D2 by a predetermined distance. The crushing roller 62*b* moves closer to the single-faced cardboard sheet D2, and crushes the medium B2 in the single-faced cardboard sheet D2 to form a crushed portion as the mark.

The marking device 62 may be configured to include four spray nozzles 62*c*, 62*d*, 62*e*, and 62*f*, instead of the two crushing rollers 62*a* and 62*b*. As illustrated by a two-dot chain line in FIG. 3, the spray nozzles 62*c*, 62*d*, 62*e*, and 62*f* are disposed between the splicers 31, 32, 33, and 34 and the single facers 13, 17 on the downstream side in the sheet transfer direction from the ultrasonic sensors 61*a*, 61*b*, 61*c*, and 61*d*.

The spray nozzles 62*c* and 62*d* are disposed away from the media B1 and B2 by a predetermined distance, and can eject an ink over a predetermined time. In addition, the spray nozzles 62*e* and 62*f* are disposed away from the top liners C1 and C2 by a predetermined distance, and can eject the ink over a predetermined time. The spray nozzles 62*c*, 62*d*, 62*e*, and 62*f* eject the ink toward the media B1 and B2 and the top liners C1 and C2 to assign the mark to the paper splice part.

The mark detection device 63 detects the mark assigned by the marking device 62. The mark detection device 63 is configured to include four mark detectors 63*a*, 63*b*, 63*c*, and 63*d*. The mark detectors 63*a*, 63*b*, 63*c*, and 63*d* are disposed between the preheater 20 and the glue machine 21. The mark detectors 63*a* and 63*b* are disposed away from surfaces of the media B1 and B2 of the single-faced cardboard sheets D1 and D2, to which the bottom liner A is bonded, by a predetermined distance. The mark detectors 63*c* and 63*d* are disposed away from the top liners C1 and C2 by a predetermined distance.

The control device 64 controls an operation of the defective sheet rejecting device 26, based on position information of the mark detected by the mark detection device 63.

[Specific Configuration of Paper Splice Part Detection Device]

Figure 5:
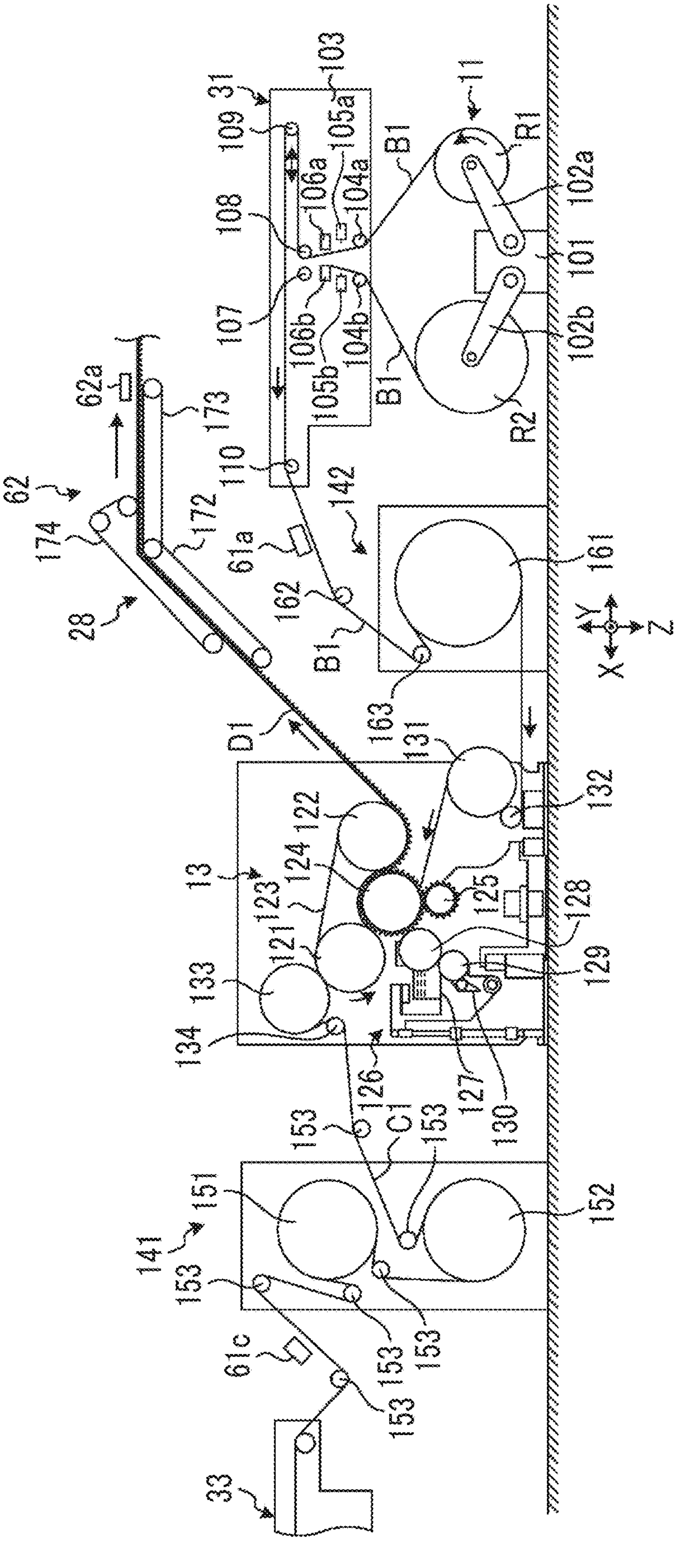
FIG. 5 is a schematic view of a peripheral part of a single facer, which illustrates disposition positions of the sheet paper splice detection unit and a marking device.
Figure 6:
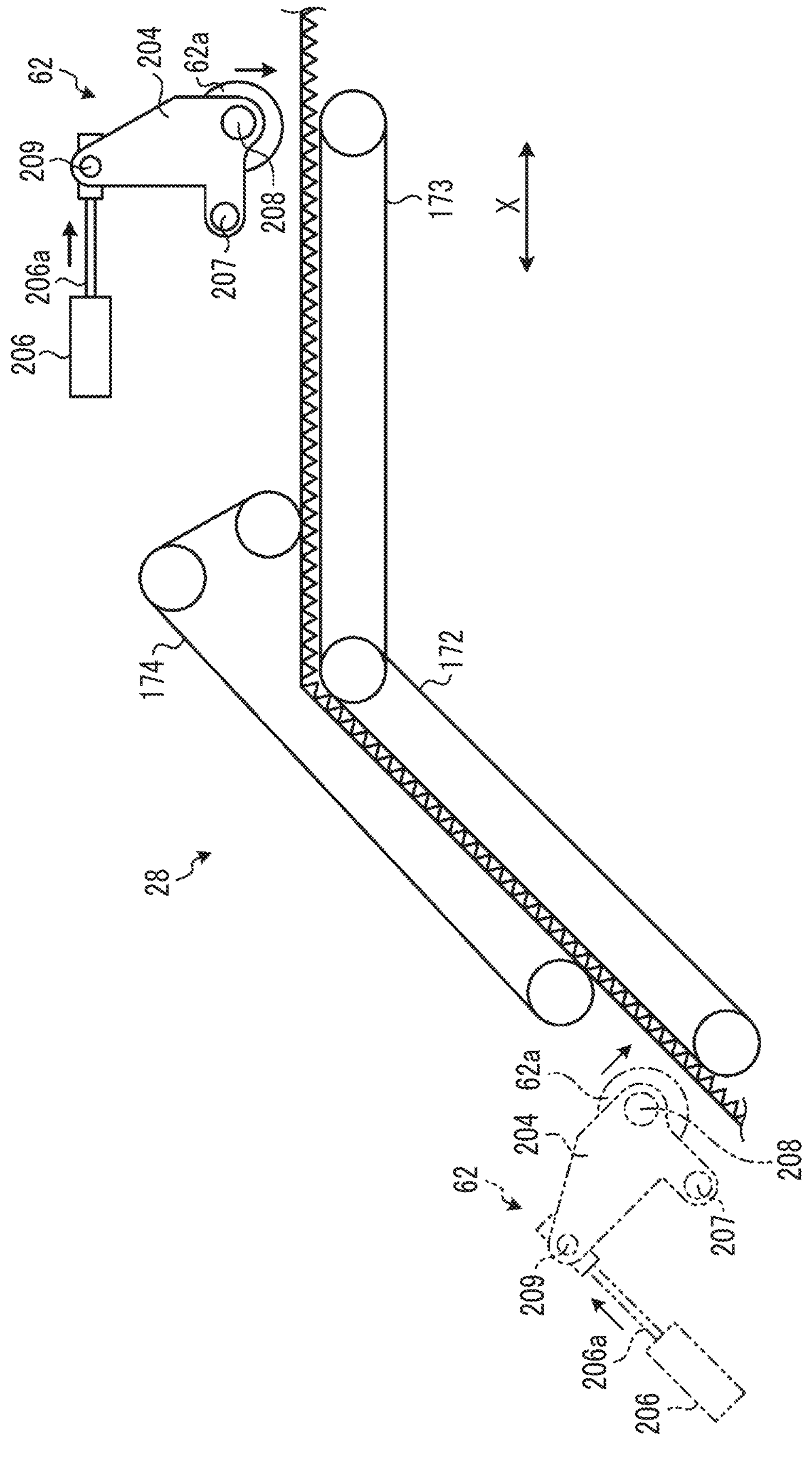
FIG. 6 is a schematic view illustrating the marking device.
Figure 7:
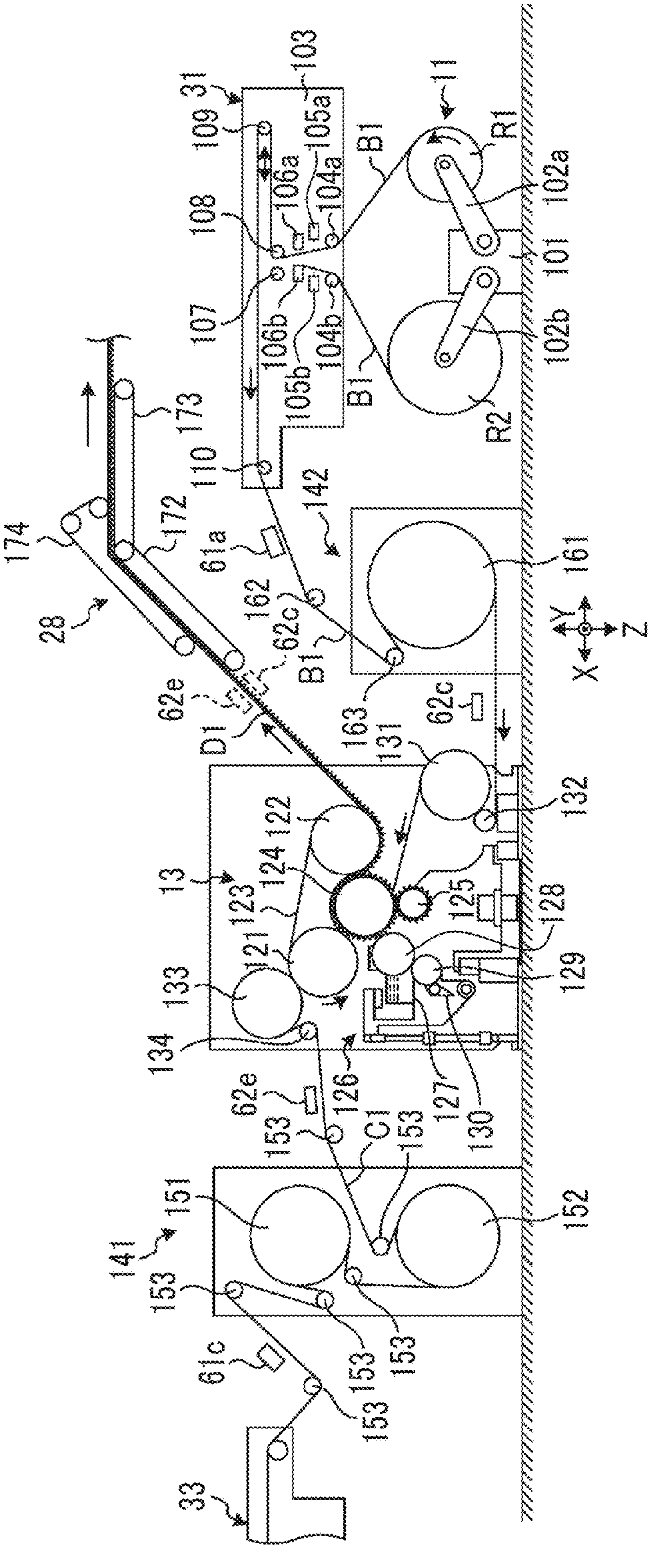
FIG. 7 is a schematic view of a peripheral part of a single facer, which illustrates a modification example of the disposition position of the marking device.
Figure 8:
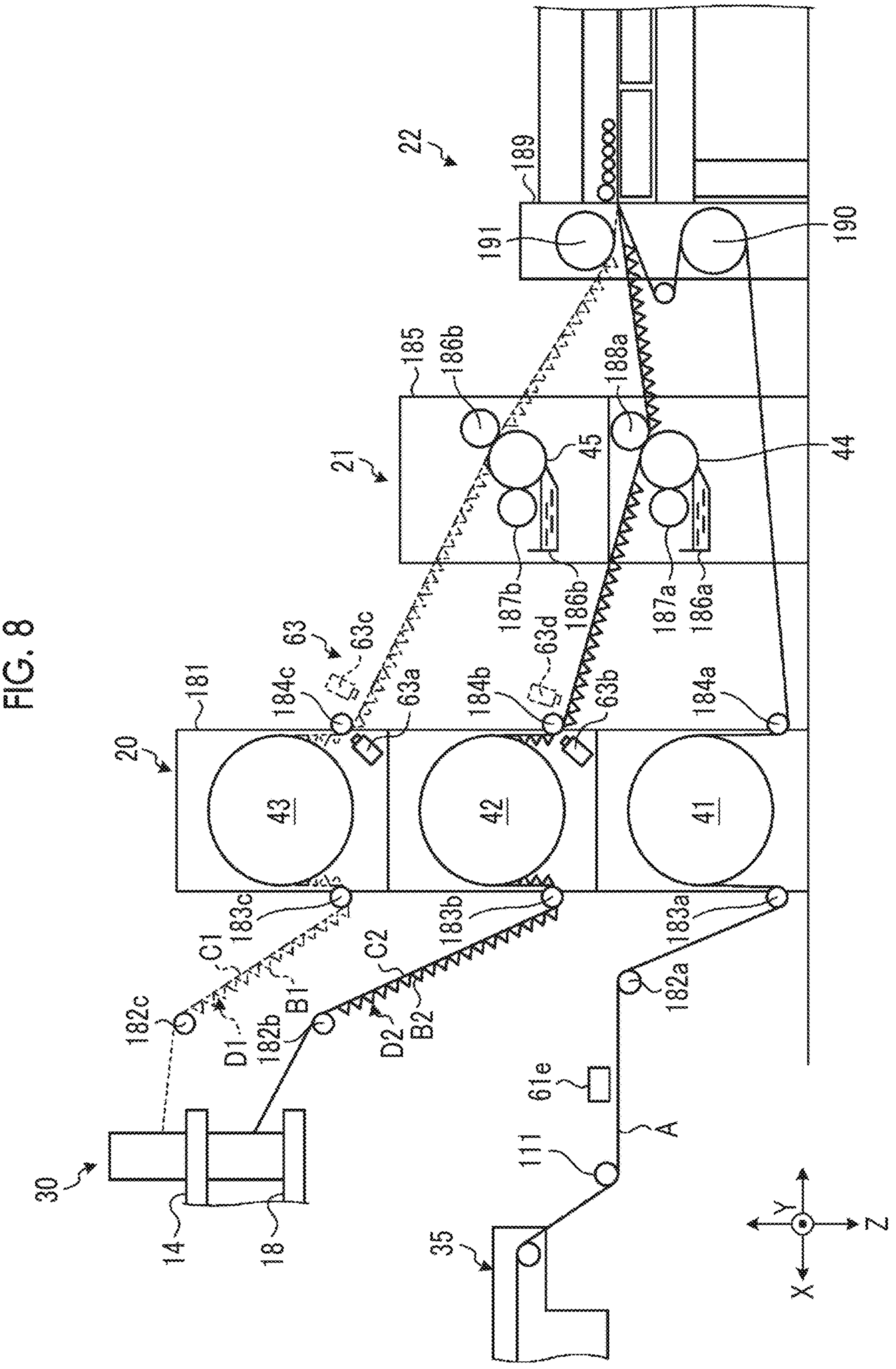
FIG. 8 is a schematic view of a peripheral part of a double facer, which illustrates disposition positions of the sheet paper splice detection unit and a mark detection device.
Figure 9:
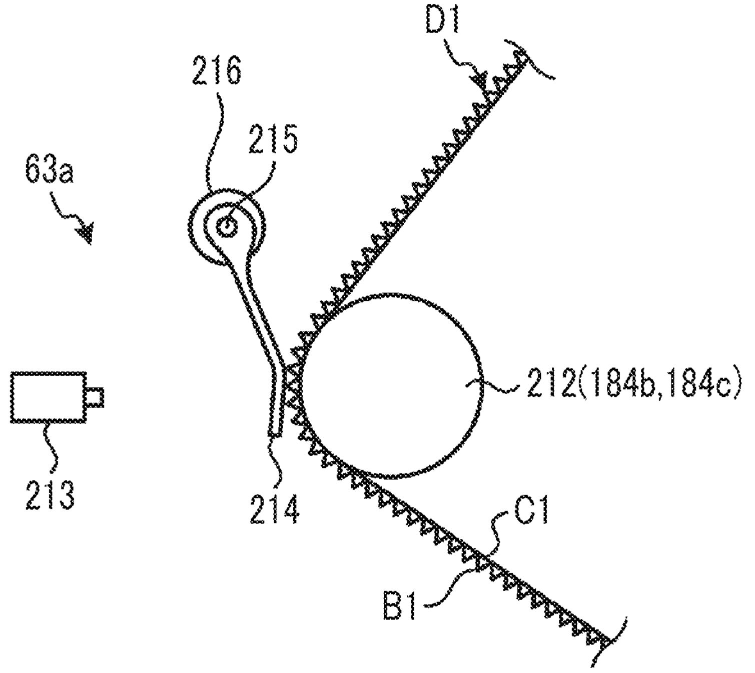
FIG. 9 is a schematic view illustrating the mark detection device.
Figure 10:
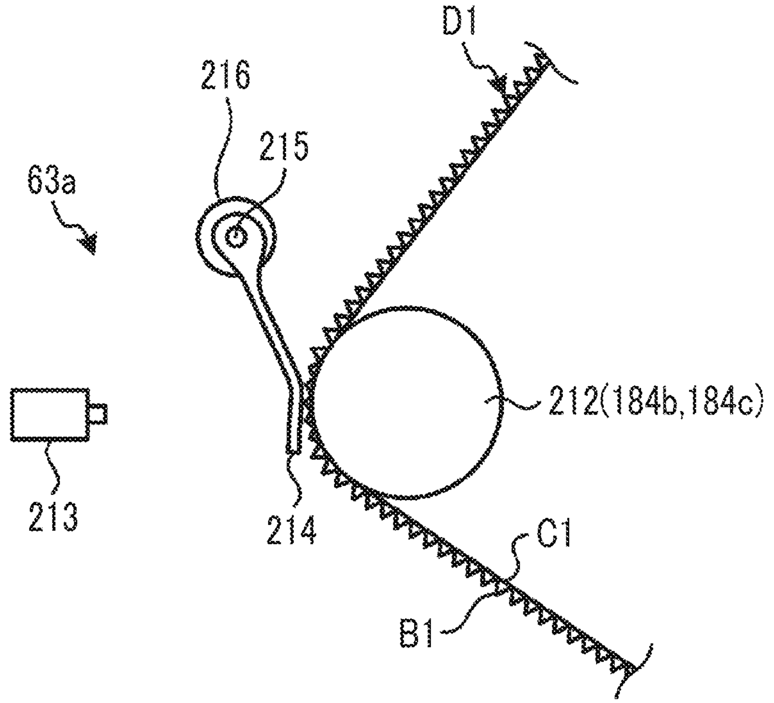
FIG. 10 is a schematic view illustrating an operation of the mark detection device.

Hereinafter, specific disposition positions of the sheet paper splice detection unit 61, the marking device 62, and the mark detection device 63 will be described. FIG. 5 is a schematic view of a peripheral part of a single facer, which illustrates the disposition position of the sheet paper splice detection unit and the marking device. FIG. 6 is a schematic view illustrating the marking device. FIG. 7 is a schematic view of a peripheral part of the single facer, which illustrates a modification example of the disposition position of the marking device. FIG. 8 is a schematic view of a peripheral part of the double facer, which illustrates the disposition positions of the sheet paper splice detection unit and the mark detection device. FIG. 9 is a schematic view illustrating the mark detection device. FIG. 10 is a schematic view illustrating an operation of the mark detection device. The single facer 13 and the single facer 17 have substantially the same configuration. Accordingly, a configuration of the peripheral part of the single facer 13 will be described, and description of the configuration of the peripheral part of the single facer 17 will be omitted.

As illustrated in FIG. 5, in the mill roll stand 11, a stand 101 is installed at a predetermined position, and roll support arms 102*a* and 102*b* are provided on both sides in the X-direction. Roll papers R1 and R2 of the medium B1 are rotatably supported in the tip portions of the roll support arms 102*a* and 102*b*. The roll papers R1 and R2 are configured so that the medium B1 having a predetermined length is wound in a roll shape. In the mill roll stand 11, for example, the roll paper R1 supported by one roll support arm 102*a* of the roll support arms 102*a* and 102*b* is rotated to supply the medium B1, and the roll paper R2 supported by the other roll support arm 102*b* is stopped to stand by for splicing of the medium B1.

The splicer 31 is disposed above the mill roll stand 11 in the Z-direction. The splicer 31 is configured so that a pair of introduction rolls 104*a* and 104*b*, a pair of knives 105*a* and 105*b*, and a pair of crimping bars 106*a* and 106*b* are disposed upward in the Z-direction of a header 103. In the splicer 31, a nip roll 107 and an acceleration roll 108 are disposed to face each other above the crimping bars 106*a* and 106*b* in the Z-direction. The introduction rolls 104*a* and 104*b*, the knives 105*a* and 105*b*, and the crimp bars 106*a* and 106*b* are provided to be close to and away from each other along the X-direction. The nip roll 107 is provided to be close to and away from the acceleration roll 108 along the X-direction. In the header 103, a dancer roll 109 and a fixing roll 110 are disposed above the nip roll 107 and the acceleration roll 108 in the Z-direction. Although not illustrated, a plurality of (for example, three) dancer rolls 109 are provided, and are movable along a horizontal direction in accordance with tension of the medium B1. That is, the dancer roll 109 is movable between a position illustrated in FIG. 5 and a position close to the fixing roll 110.

Therefore, when the medium B1 is fed from the roll paper R1, the medium B1 passes between the introduction rolls 104*a* and 104*b*, passes between the knives 105*a* and 105*b*, passes between the crimping bars 106*a* and 106*b*, and is transferred from the acceleration roll 108 to the fixing roll 110 via the dancer roll 109. When the splicing is performed by the splicer 31, the feeding of the medium B1 from the roll paper R1 is stopped, and the medium B1 from the roll paper R2 on standby is bonded to the medium B1 of the roll paper R1 to perform the splicing. Thereafter, the roll paper R2 is rotated to feed the medium B1.

That is, the medium B1 is fed from the roll paper R2, and is mounted on the crimping bar 106*b*. A feeding speed of the medium B1 from the roll paper R1 is lowered, and the dancer roll 109 moves to the fixing roll 110 side. In this manner, the stagnating medium B1 starts to be consumed. Here, the feeding of the medium B1 from the roll paper R1 is stopped, and the crimping bars 106*a* and 106*b* are moved closer to each other. In this manner, the medium B1 from the roll paper A2 is brought into pressurizing contact with the medium B1 from the roll paper R1, and both are crimped with an adhesive agent (double-faced tape). Simultaneously with this operation, the knife 105*a* moves forward and cuts the medium B1 from the roll paper R1.

During the splicing, while the stagnant medium B1 is continuously released, the dancer roll 109 moves to hold constant tension of the medium B1. When the medium B1 from the roll paper R1 is cut and the medium B1 is fed from the roll paper R2, the nip roll 107 comes into contact with the acceleration roll 108 to raise a rotation speed of the acceleration roll 108. In this manner, after the stagnant medium B1 is completely released, the dancer roll 109 starts to move, and returns to an original position.

The mill roll stand 12 (refer to FIG. 1) for feeding the top liner C1 and the splicer 33 for splicing the top liner C1 are substantially the same as the mill roll stand 11 and the splicer 31.

The single facer 13 includes a belt roll 121, a tension roll 122, a pressurizing belt 123, an upper corrugating roll 124, a lower corrugating roll 125, and an adhesive equipment 126.

The belt roll 121 can be driven to rotate by a drive device (not illustrated). The tension roll 122 is rotatably supported at a predetermined interval from the belt roll 121. The pressurizing belt 123 is an endless belt, and is hung between the belt roll 121 and the tension roll 122. The upper corrugating roll 124 can be driven to rotate by a drive device (not illustrated), and an outer peripheral surface is formed in a corrugated shape. The upper corrugating roll 124 is disposed below the pressurizing belt 123 in the Z-direction between the belt roll 121 and the tension roll 122, and a corrugated outer peripheral surface abuts on a lower surface of the pressurizing belt 123 in a pressurized state. As in the upper corrugating roll 124, the lower corrugating roll 125 has the outer peripheral surface formed in a corrugated shape, and meshes with the outer peripheral surface of the upper corrugating roll 124 below the upper corrugating roll 124 in the Z-direction. The belt roll 121, the tension roll 122, the upper corrugating roll 124, and the lower corrugating roll 125 are heated by internally circulating steam. The medium B1 and the top liner C are heated via the pressurizing belt 123 and the upper corrugating roll 124.

The adhesive equipment 126 is disposed in the vicinity of the upper corrugating roll 124 in the X-direction. The adhesive equipment 126 includes an adhesive dam 127, an adhesive applicator roll 128, a meter roll 129, and an adhesive scraping blade 130. The adhesive dam 127 stores a predetermined amount of the adhesive. The adhesive applicator roll 128 performs adhesion by causing the adhesive stored in the adhesive dam 127 to adhere to the medium B1 transferred by the upper corrugating roll 124. The meter roll 129 comes into contact with the outer peripheral surface of the adhesive applicator roll 128, and synchronously rotates to adjust the amount of the adhesive adhering to the outer peripheral surface of the adhesive applicator roll 128. Since the adhesive scraping blade 130 comes into contact with the outer peripheral surface of the meter roll 129, the adhesive scraping blade 130 removes the adhesive from the adhesive applicator roll 128, and scrapes off the extra adhesive adhering to the outer peripheral surface of the meter roll 129.

The single facer 13 is provided with a preheating roll 131 and an angle adjusting roll 132 which introduce the medium B1 supplied from the splicer 31 between the upper corrugating roll 124 and the lower corrugating roll 125. The angle adjusting roll 132 moves around the preheating roll 131 to adjust a contact position where the medium B1 comes into contact with the outer peripheral surface of the preheating roll 131. In addition, the single facer 13 is provided with a preheating roll 133 and a fixing roll 134 which introduce the top liner C1 supplied from the splicer 33 between the pressurizing belt 123 and the upper corrugating roll 124.

The single facer 13 includes preheaters 141 and 142. The preheater 141 preheats the top liner C1. The preheater 141 is disposed adjacent to the preheating roll 133. The preheater 141 includes two preheating rolls 151 and 152 aligned in the Z-direction. The top liner C1 is wound around the preheating rolls 151 and 152 to heat the top liner C1. The preheating rolls 151 and 152 include a winding amount adjusting device (not illustrated), and steam is supplied into the preheating rolls 151 and 152 to be heated to a predetermined temperature. A plurality of guide rolls 153 are provided on the upstream side and the downstream side in the preheating rolls 151 and 152.

The preheater 142 preheats the medium B1. The preheater 142 is disposed adjacent to the preheating roll 131. The preheater 142 includes one preheating roll 161. The medium B1 is wound around the preheating roll 161 to heat the medium B1. The preheating roll 161 includes a winding amount adjusting device (not illustrated), and steam is supplied into the preheating roll 161 to be heated to a predetermined temperature. The guide roll 162 is provided on the upstream side in the preheating roll 161.

In addition, a take up conveyor 28 is provided in the single facer 13. The take up conveyor 28 guides the single-faced cardboard sheet D1 formed from the single facer 13, and supplies the single-faced cardboard sheet D1 to the bridge 14 (refer to FIG. 1). The take up conveyor 28 includes a first lower belt 172, a second lower belt 173, and an upper belt 174. The first lower belt 172 and the second lower belt 173 are disposed obliquely upward, and the upper belt 174 is disposed along the horizontal direction. The first lower belt 172, the second lower belt 173, and the upper belt 174 can be driven by a drive device (not illustrated). The single-faced cardboard sheet D1 is transferred while being pinched between the first lower belt 172, the second lower belt 173, and the upper belt 174.

Therefore, the top liner C1 is supplied from the splicer 33 to the single facer 13 via the preheater 141. Therefore, the top liner C1 is wound around the preheating roll 133, and thereafter, is transferred to a nip portion between the pressurizing belt 123 and the upper corrugating roll 124 together with the pressurizing belt 123 guided by the belt roll 121. On the other hand, the medium B1 is supplied from the splicer 31 to the single facer 13 via the preheater 142. After being wound around the preheating roll 131, the medium B1 is processed into a corrugated shape in a meshing portion between the upper corrugating roll 124 and the lower corrugating roll 125, is guided by the upper corrugating roll 124, and is transferred to the nip portion between the pressurizing belt 113 and the upper corrugating roll 114.

The medium B1 is processed into a corrugated shape in the meshing portion between the upper corrugating roll 124 and the lower corrugating roll 125, and thereafter, receives the adhesive application by the adhesive equipment 126. Therefore, the adhesive stored in the adhesive dam 127 adheres to the rotating adhesive applicator roll 128, and the amount of the adhesive adhering to the outer peripheral surface is adjusted by the meter roll 129. The medium B1 processed into a corrugated shape in the meshing portion between the upper corrugating roll 124 and the lower corrugating roll 125 comes into contact with the adhesive applicator roll 128, and receives the adhesive application in each flute top. When the glued medium B1 is transferred to the nip portion between the pressurizing belt 123 and the upper corrugating roll 124, the medium B1 adheres to the top liner C1 to form the single-faced cardboard sheet D1.

As the sheet paper splice detection unit 61, the single facer 13 is provided with an ultrasonic sensor 61*a* for detecting a paper splice part of the medium B1 and an ultrasonic sensor 61*c* for detecting a paper splice part of the top liner C1. The ultrasonic sensor 61*a* is disposed between the fixing roll 110 of the splicer 31 and the guide roll 162 of the preheater 142. The ultrasonic sensor 61*a* detects the paper splice part of the medium B1 transferred between the fixing roll 110 of the splicer 31 and the guide roll 162 of the preheater 142. The disposition position of the ultrasonic sensor 61*a* is not limited to this position. The ultrasonic sensor 61*a* may be disposed between the dancer roll 109 of the splicer 31 and the preheating roll 131 of the single facer 13. In this case, the dancer roll 109 feeds the stagnating medium B1 while moving during the splicing. Therefore, it is preferable that the dancer roll 109 is located downstream from a maximum moving position of the dancer roll 109.

The ultrasonic sensor 61*c* is disposed between the guide rolls 153 of the preheater 141. The ultrasonic sensor 61*c* detects a paper splice part of the top liner C1 transferred between the guide rolls 153 of the preheater 141. The disposition position of the ultrasonic sensor 61*c* is not limited to this position. The ultrasonic sensor 61*c* may be disposed between the dancer roll 109 of the splicer 33 and the preheating roll 133 of the single facer 13. In this case, the dancer roll 109 feeds the stagnating top liner C1 while moving during the splicing. Therefore, it is preferable that the dancer roll 109 is located downstream from the maximum moving position of the dancer roll 109.

As the marking device 62, the single facer 13 is provided with a crushing roller 62*a* that assigns a mark (crushed portion) to the single-faced cardboard sheet D2. The crushing roller 62*a* is disposed between the single facer 13 and the bridge 14 on the downstream side of the take up conveyor 28. The crushing roller 62*a* forms the crushed portion as the mark by crushing the medium B1 in the single-faced cardboard sheet D formed in such a manner that the medium B1 processed into a corrugated shape by the single facer 13 and the top liner C1 are bonded to each other.

Here, the disposition positions of the ultrasonic sensors 61*a* and 61*c* serving as the sheet paper splice detection unit 61 disposed around the peripheral part of the single facer 13 and the crushing roller 62*a* serving as the marking device 62 have been described. Although not illustrated, the disposition positions of the ultrasonic sensors 61*b* and 61*d* serving as the sheet paper splice detection unit 61 disposed around the peripheral part of the single facer 17 and the crushing rollers 62*b* serving as the marking device 62 are the same.

As illustrated by a solid line in FIG. 6, the marking device 62 is disposed on the downstream side in the transfer direction of the take up conveyor 28. The take up conveyor 28 includes a first lower belt 172, a second lower belt 173, and an upper belt 174. The marking device 62 assigns the mark to the corrugated medium B1 in the single-faced cardboard sheet D1 transferred by each of the belts 172, 173, and 174. The marking device 62 assigns the mark by crushing the corrugated medium B1 in the single-faced cardboard sheet D1.

The marking device 62 includes a pivoting link 204, a crushing roller 62*a*, and an air cylinder (or a hydraulic cylinder) 206. The pivoting link 204 is supported to be pivotable around a frame (not illustrated) by an attachment member 207. The crushing roller 62*a* is rotatably supported by a support member 208 in a lower portion of the pivoting link 204. The air cylinder 206 is mounted on a frame (not illustrated), and a tip portion of a drive rod 206*a* is connected to an upper portion of the pivoting link 204 by a connecting member 209. The crushing roller 62*a* is disposed above the guide roll supporting the second lower belt 173 at a predetermined gap. The predetermined gap is a gap at which the single-faced cardboard sheet D1 supported by the guide roll can be transferred without coming into contact with the crushing roller 62*a*.

Therefore, the single-faced cardboard sheet D1 is transferred by the take up conveyor 28. As illustrated in FIGS. 4 and 6, the control device 64 operates the marking device 62, based on a detection result of the sheet paper splice detection unit 61. That is, in the marking device 62, the drive rod 206*a* is extended by the operation of the air cylinder 206, and the pivoting link 204 pivots in a clockwise direction in FIG. 6. In this case, the crushing roller 62*a* moves closer to the single-faced cardboard sheet D1 guided to the second lower belt 173, and the medium B1 in the single-faced cardboard sheet D1 is crushed to assign the mark. The mark detection device 63 (refer to FIG. 3) detects the sheet paper splice part by detecting the crushed portion of the medium B1 in the single-faced cardboard sheet D1. In this case, since the marking device 62 does not use the ink, the ink does not adhere to the single-faced cardboard sheet D1, and the single-faced cardboard sheet D1 can be prevented from being contaminated.

In addition, as illustrated by a two-dot chain line in FIG. 6, the marking device 62 may be disposed on the upstream side in the transfer direction of the take up conveyor 28. The crushing roller 62*a* is disposed above the guide roll supporting the first lower belt 172 at a predetermined gap. The predetermined gap is a gap at which the single-faced cardboard sheet D1 supported by the guide roll can be transferred without coming into contact with the crushing roller 62*a*. The marking device 62 assigns the mark to the corrugated medium B1 in the single-faced cardboard sheet D1 before being transferred by each of the belts 172, 173, and 174.

In the above description, the crushing rollers 62*a* and 62*b* are provided as the marking device 62. However, the crushing rollers 62*a* and 62*b* may be drivable rollers, or may be rotating rollers capable of rotating together. In addition, the configuration is not limited to the crushing rollers 62*a* and 62*b*, and may be a crushing block or a crushing plate. The configuration is not limited to a shape thereof. In addition, the crushing rollers 62*a* and 62*b* are supported to be pivotable by the pivoting link 204. However, the crushing rollers 62*a* and 62*b* may be slidable. Furthermore, a drive motor may be used instead of the air cylinder (or the hydraulic cylinder) 206.

When the spray nozzles 62*c* and 62*e* are applied as the marking device 62, the disposition position is different from that of the crushing roller 62*a*. FIG. 7 is a schematic view of a peripheral part of the single facer, which illustrates a modification example of the disposition position of the marking device.

As illustrated by a solid line in FIG. 7, the spray nozzle 62*c* is disposed between the preheating roll 161 of the preheater 142 and the preheating roll 131 of the single facer 13. The spray nozzle 62*c* ejects the ink onto a surface of the medium B1 transferred between the preheating roll 161 of the preheater 142 and the preheating roll 131 of the single facer 13, to which the bottom liner A is bonded. In this manner, the mark is assigned to the paper splice part. The disposition position of the spray nozzle 62*c* is not limited to this position. The spray nozzle 62*c* may be disposed between the dancer roll 109 of the splicer 31 and the preheating roll 131 of the single facer 13 on the downstream side in the sheet transfer direction from the ultrasonic sensor 61*a*.

The spray nozzle 62*e* is disposed between the guide roll 153 of the preheater 141 and the preheating roll 133 of the single facer 13. The spray nozzle 62*e* ejects the ink onto a surface of the top liner C1 transferred between the guide roll 153 of the preheater 141 and the preheating roll 133 of the single facer 13, to which the medium B1 is not bonded. In this manner, the mark is assigned to the paper splice part. The disposition position of the spray nozzle 62*e* is not limited to this position. The spray nozzle 62*e* may be disposed between the dancer roll 109 of the splicer 33 and the preheating roll 133 of the single facer 13 on the downstream side in the sheet transfer direction from the ultrasonic sensor 61*c*.

For example, the spray nozzle 62*c* forming the marking device 62 assigns the mark to the medium B1 forming the single-faced cardboard sheet D1. The spray nozzle 62*e* assigns the mark to the top liner C1 forming the single-faced cardboard sheet D1. That is, the spray nozzles 62*c* and 62*e* assign the mark to the single-faced cardboard sheet D1 formed by bonding the medium B1 and the top liner C1 with the single facer 13. The spray nozzles 62*c* and 62*e* are disposed at positions facing each other across a transfer path of the single-faced cardboard sheet D1 on an outlet side of the single facer 13.

The marking device 62 (spray nozzles 62*c* and 62*e*) may be configured in any way as long as the mark is assigned to the single-faced cardboard sheet D1, and the configuration is not limited to the disposition position. The marking device 62 may be disposed between the single facer 13 and the double facer 22. In addition, only one of the spray nozzles 62*c* and 62*e* may be disposed. For example, when only the spray nozzle 62*c* is disposed, the control device 64 operates the spray nozzle 62*c* so that the mark is assigned to the medium B1 at the positions corresponding to the paper splice part of the medium B1 and the paper splice part of the top liner C1. When only the spray nozzle 62*e* is disposed, the configuration is reversed. In this manner, the number of the marking devices 62 can be reduced.

In addition, when only one of the spray nozzles 62*c* and 62*e* is disposed, the mark is assigned to either the medium or the top liner. Therefore, the number of the mark detection devices 63 can also be reduced. For example, when the mark is assigned only to the medium B1 by the spray nozzle 62*c*, only the mark detector 63*a* may be disposed. In addition, for example, when the mark is assigned only to the top liner C1 by the spray nozzle 62*e*, only the mark detector 63*c* may be disposed.

Here, the disposition positions of the spray nozzles 62*c* and 62*e* serving as the marking device 62 have been described. Although not illustrated, the same applies to the disposition positions of the spray nozzles 62*d* and 62*f* serving as the marking devices 62 disposed in the peripheral part of the single facer 17.

As illustrated in FIG. 8, the paper guide device 30 is provided in each of the outlet parts of the bridge 14 and the bridge 18. The paper guide device 30 includes a twisting roller (not illustrated), and the twisting roller comes into contact with the upper surfaces of the single-faced cardboard sheet D1 and the single-faced cardboard sheet D2, that is, the top liner C1 and the top liner C2. In a state where the twisting roller is brought into contact with the single-faced cardboard sheet, one end portion of the twisting roller is moved in the X-direction by a moving device (not illustrated). In this case, the twisting roller is inclined in the X-direction, and the single-faced cardboard sheet D1 and the single-faced cardboard sheet D2 are guided to the twisting roller. In this manner, the positions of the single-faced cardboard sheet D1 and the single-faced cardboard sheet D2 in the Y-direction are adjusted, and meandering or transferring biased to any one in the Y-direction is suppressed.

The preheater 20 is configured so that the preheating rolls 41, 42, and 43 are rotatably supported by a frame 181. The preheating rolls 41, 42, and 43 heat the bottom liner A, the single-faced cardboard sheet D1, and the single-faced cardboard sheet D2. In the preheating rolls 41, 42, and 43, each of the guide rolls 182*a*, 182*b*, and 182*c* and the winding angle adjusting rolls 183*a*, 183*b*, and 183*c* is disposed on the upstream side in the transfer direction, and each of the guide rolls 184*a*, 184*b*, and 184*c* is disposed on the downstream side. The winding angle adjusting rolls 183*a*, 183*b*, and 183*c* move in a circumferential direction of the preheating rolls 41, 42, and 43. In this manner, winding angles of the bottom liner A, the single-faced cardboard sheet D1, and the single-faced cardboard sheet D2 are adjusted to adjust a preheating temperature.

The glue machine 21 is configured so that the adhesive applicator rolls 44 and 45 are rotatably supported by a frame 185. Each of the adhesive applicator rolls 44 and 45 applies the adhesive of the adhesive dams 186*a* and 186*b* to each of the media B1 and B2 in the single-faced cardboard sheet D1 and the single-faced cardboard sheet D2. In the adhesive applicator rolls 44 and 45, the meter rolls 187*a* and 187*b* for adjusting the adhesion amount of the adhesive are disposed in contact, and rider rolls 188*a* and 188*b* are disposed to face each other. In the double facer 22, the preheaters 190 and 191 are rotatably supported by a frame 189. The bottom liner A is guided to the double facer 22 via the preheater 190, and the single-faced cardboard sheets D1 and D2 are guided to the double facer 22 via the preheater 191.

As the sheet paper splice detection unit 61, an ultrasonic sensor 61*e* that detects the paper splice part of the bottom liner A is provided. The ultrasonic sensor 61*e* is disposed between the fixing roll 111 of the splicer 35 and the guide roll 182*a* of the preheater 20. The ultrasonic sensor 61*e* detects the paper splice part of the bottom liner A transferred between the fixing roll 111 of the splicer 35 and the guide roll 182*a* of the preheater 20. The disposition position of the ultrasonic sensor 61*e* is not limited to this position. The ultrasonic sensor 61*e* may be disposed between the dancer roll 109 of the splicer 35 and the preheater 190 of the double facer 22. In this case, the dancer roll 109 feeds the stagnating bottom liner A while moving during the splicing. Therefore, it is preferable that the dancer roll 109 is located downstream from the maximum moving position of the dancer roll 109.

As the mark detection device 63, the mark detectors 63*a* and 63*b* which detect each mark in the single-faced cardboard sheets D1 and D2 are provided. The mark detectors 63*a* and 63*b* are disposed between the paper guide device 30 and the adhesive applicator rolls 44 and 45 of the glue machine 21. More specifically, the mark detectors 63*a* and 63*b* are disposed between the preheating rolls 42 and 43 of the preheater 20 and the adhesive applicator rolls 44 and 45 of the glue machine 21. The mark detectors 63*a* and 63*b* detect the mark in the single-faced cardboard sheets D1 and D2 transferred between the paper guide device 30 and the adhesive applicator rolls 44 and 45 of the glue machine 21. More specifically, the mark detectors 63*a* and 63*b* detect the mark in the single-faced cardboard sheets D1 and D2 transferred between the preheating rolls 42 and 43 of the preheater 20 and the adhesive applicator rolls 44 and 45 of the glue machine 21. In this case, the single-faced cardboard sheet D1 and the single-faced cardboard sheet D2 are adjusted to positions in the Y-direction by the paper guide device 30, and meandering or transferring biased to any one in the Y-direction is suppressed. Therefore, the mark detectors 63*a* and 63*b* can highly accurately detect the paper splice part.

In addition, for example, the mark detectors 63*a* and 63*b* are disposed at positions facing the guide rolls 184*c* and 184*b*. Since the single-faced cardboard sheet D1 and the single-faced cardboard sheet D2 are in contact with the guide rolls 184*c* and 184*b*, vibration during the transferring is suppressed. Therefore, the mark detectors 63*a* and 63*b* can highly accurately detect the paper splice part. The disposition positions of the mark detectors 63*a* and 63*b* are not limited to these positions. The mark detectors 63*a* and 63*b* may be disposed between the bridges 14 and 18 and the double facer 22 on the downstream side in the sheet transfer direction from the marking device 62 (crushing rollers 62*a* and 62*b*).

As illustrated in FIGS. 2 and 3, positions of the paper splice parts of the bottom liner A, the media B1 and B2, and the top liners C1 and C2 which are detected by the sheet paper splice detection unit 61 (ultrasonic sensors 61*a*, 61*b*, 61*c*, 61*d*, and 61*e*) are input to the control device 64. The control device 64 calculates a time required until the sheet paper splice parts of the media B1 and B2 and the top liners C1 and C2 reach the marking device 62, based on a time at which the sheet paper splice detection unit 61 detects the paper splice parts of the media B1 and B2 and the top liners C1 and C2, transfer speeds of the media B1 and B2 and the top liners C1 and C2, and a distance from the sheet paper splice detection unit 61 to the marking device 62 (crushing rollers 62*a* and 62*b*). The control device 64 operates the crushing rollers 62*a* and 62*b* for a predetermined time, when the paper splice parts of the media B1 and B2 and the top liners C1 and C2 reach the marking device 62.

In this case, operation times of the crushing rollers 62*a* and 62*b* are adjusted in accordance with the transfer speeds of the media B1 and B2 and the top liners C1 and C2. That is, an optimum shape of the mark formed in the single-faced cardboard sheets D1 and D2 is set in accordance with performance of the mark detection device 63, and the operation times of the crushing rollers 62*a* and 62*b* are adjusted so that the mark formed in the single-faced cardboard sheets D1 and D2 has the optimum shape. Here, when the transfer speeds of the media B1 and B2 and the top liners C1 and C2 are raised, the operation times of the crushing rollers 62*a* and 62*b* are shortened. When the transfer speeds of the media B1 and B2 and the top liners C1 and C2 are lowered, the operation times of the crushing rollers 62*a* and 62*b* are lengthened.

In addition, the control device 64 controls an operation timing of the defective sheet rejecting device 26, based on position information of the mark detected by the mark detection device 63 (mark detectors 63*a* and 63*b*). In addition, the control device 64 controls the operation timing of the defective sheet rejecting device 26, based on position information of the paper splice part of the bottom liner A detected by the sheet paper splice detection unit 61 (ultrasonic sensor 61*e*). The control device 64 operates the defective sheet rejecting device 26 at a predetermined timing to remove the double-faced cardboard sheet F having the paper splice part from the transfer line.

In this case, the control device 64 can estimate the length of the mark in the single-faced cardboard sheets D1 and D2 in the transfer direction, based on the transfer speeds of the single-faced cardboard sheets D1 and D2 and the operation times of the crushing rollers 62*a* and 62*b* operated by the marking device 62, and can estimate a positional relationship between the paper splice part and the mark. In addition, a transfer distance of the double-faced cardboard sheet E (F) from the mark detection device 63 to the defective sheet rejecting device 26 is input in advance to the control device 64, and the control device 64 calculates a time required until the mark detection device 63 detects the mark and the mark reaches the defective sheet rejecting device 26 after a detection signal is input.

Therefore, the control device 64 specifies the double-faced cardboard sheet F in which the mark is formed, based on the length of the mark detected by the mark detection device 63. The control device 64 operates the defective sheet rejecting device 26 at a timing at which the double-faced cardboard sheet F in which the mark is formed reaches, and removes the double-faced cardboard sheet F having the mark (paper splice part) from the transfer line. In addition, the control device 64 specifies the double-faced cardboard sheet F in which the paper splice part is formed, based on the length of the paper splice part of the bottom liner A detected by the sheet paper splice detection unit 61 (ultrasonic sensor 61*e*). The control device 64 operates the defective sheet rejecting device 26 at a timing at which the double-faced cardboard sheet F in which the paper splice part is formed reaches, and removes the double-faced cardboard sheet F having the paper splice part from the transfer line.

When the crushing rollers 62*a* and 62*b* are applied as the marking device 62, the two mark detectors 63*a* and 63*b* are applied to the mark detection device 63. However, when the spray nozzles 62*c*, 62*d*, 62*e*, and 62*f* are applied as the marking device 62, the four mark detectors 63*a*, 63*b*, 63*c*, and 63*d* are applied to the mark detection device 63.

As illustrated in FIG. 9, the mark detector 63*a* serving as the mark detection device 63 when the crushing roller 62*a* is applied as the marking device 62 detects the mark assigned to the medium B1 in the single-faced cardboard sheet D1 transferred by the guide roll 212. For example, the mark detector 63*a* is disposed together with the guide roll 212 at a desired location between the preheater 20 and the glue machine 21 (both refer to FIG. 8). The mark detector 63*a* detects a crushed portion of the medium B1 in the single-faced cardboard sheet D1, as the mark.

The mark detector 63*a* includes a position detector 213 and a detection lever 214. For example, the position detector 213 is a laser displacement sensor, and can detect a position of the detection lever 214. A base end portion of the detection lever 214 is supported to be pivotable around a frame (not illustrated) by an attachment member 215. In FIG. 9, the detection lever 214 is biased and supported by a spring member 216 in the counterclockwise direction around the attachment member 215. The tip portion of the detection lever 214 comes into contact with the medium B1 in the single-faced cardboard sheet D1 due to a biasing force of the spring member 216.

The single-faced cardboard sheet D1 is guided and transferred by the guide rolls 212 (guide rolls 184*b* and 184*c*). The position detector 213 detects a position of a tip portion of the detection lever 214. At this time, when the medium B1 in the single-faced cardboard sheet D1 is not crushed, the tip portion of the detection lever 214 is in contact with a top of the medium B1 in the single-faced cardboard sheet D1. The position detector 213 detects the position of the tip portion of the detection lever 214 which is in contact with the top of the medium B1. On the other hand, as illustrated in FIG. 10, when the medium B1 in the single-faced cardboard sheet D1 is crushed, the tip portion of the detection lever 214 is in contact with the crushed portion of the medium B1 in the single-faced cardboard sheet D1. The position detector 213 detects the position of the tip portion of the detection lever 214 which is in contact with the crushed portion of the medium B1. As illustrated in FIGS. 4 and 10, the control device 64 detects the mark, based on the position of the tip portion of the detection lever 214 detected by the position detector 213. That is, when the position detector 213 detects the tip portion of the detection lever 214 which is in contact with the crushed portion of the medium B1, a detection distance is lengthened. When the detection distance exceeds a preset determination distance, the control device 64 detects the crushed portion as the mark.

Figure 11:
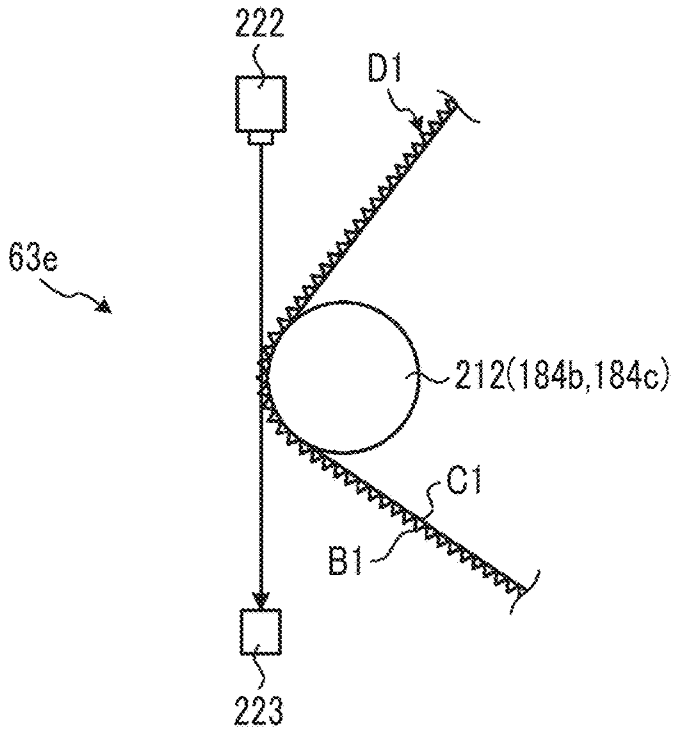
FIG. 11 is a schematic view illustrating a first modification example of the mark detection device.
Figure 12:
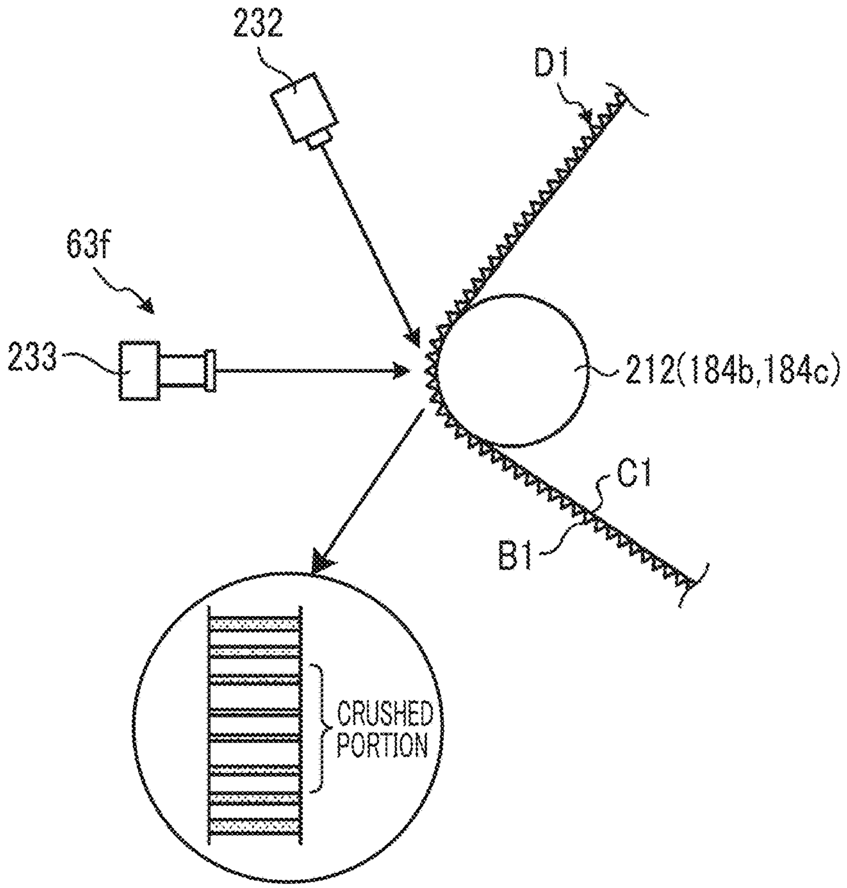
FIG. 12 is a schematic view illustrating a second modification example of the mark detection device.

The mark detection device is not limited to the above-described disposition or configuration. FIG. 11 is a schematic view illustrating a first modification example of the mark detection device, and FIG. 12 is a schematic view illustrating a second modification example of the mark detection device.

In the first modification example, as illustrated in FIG. 11, a mark detector 63*e* detects the mark assigned to the medium B1 in the single-faced cardboard sheet D1 transferred by the guide roll 212. The mark detector 63*e* detects the crushed portion of the medium B1 in the single-faced cardboard sheet D1 as the mark.

The mark detector 63*e* includes an irradiation device 222 and a light receiving device 223. For example, the irradiation device 222 irradiates the medium B1 with a laser beam having a predetermined width. The irradiation device 222 irradiates the medium B1 with the laser beam in a tangential direction of the single-faced cardboard sheet D1 guided by the guide roll 212. At this time, the irradiation device 222 irradiates the medium B1 in the single-faced cardboard sheet D1 with the laser beam toward. The light receiving device 223 receives the laser beam emitted by the irradiation device 222. The light receiving device 223 is disposed to face an irradiation destination of the laser beam emitted from the irradiation device 222. The light receiving device 223 receives the laser beam which is emitted from the irradiation device 222 and is not blocked by the medium B1 in the single-faced cardboard sheet D1.

The single-faced cardboard sheet D1 is guided and transferred by the guide rolls 212 (guide rolls 184*b* and 184*c*). The irradiation device 222 irradiates the medium B1 in the single-faced cardboard sheet D1 guided by the guide roll 212 with the laser beam. At this time, when the medium B1 in the single-faced cardboard sheet D1 is not crushed, the laser beam is blocked by the medium B1. In this case, the light receiving device 223 receives the laser beam whose width is reduced when the laser beam is blocked by the medium B1. On the other hand, when the medium B1 in the single-faced cardboard sheet D1 is crushed, the amount of the laser beam blocked by the medium B1 decreases. In this case, the light receiving device 223 receives the laser beam whose width is hardly reduced without being blocked by the medium B1. As illustrated in FIGS. 4 and 11, the control device 64 detects the mark, based on the width of the laser beam received by the light receiving device 223. That is, when the width of the laser beam received by the light receiving device 223 exceeds a preset determination value, the crushed portion is detected as the mark.

In the second modification example, as illustrated in FIG. 12, a mark detector 63*f* detects the mark assigned to the medium B1 in the single-faced cardboard sheet D1 transferred by the guide roll 212. The mark detector 63*f* detects the crushed portion of the medium B1 in the single-faced cardboard sheet D1 as the mark.

The mark detector 63*f* includes an irradiation device 232 and an imaging device 233. For example, the irradiation device 232 irradiates the medium B1 with light having a predetermined width. The irradiation device 232 irradiates medium B1 in the single-faced cardboard sheet D1 guided by the guide roll 212 with the light. The imaging device 233 images a light irradiation portion in the medium B1.

The single-faced cardboard sheet D1 is guided and transferred by the guide rolls 212 (guide rolls 184*b* and 184*c*). The irradiation device 232 irradiates medium B1 in the single-faced cardboard sheet D1 guided by the guide roll 212 with the light. The imaging device 233 images the light irradiation portion in the medium B1. As illustrated in FIGS. 4 and 12, the control device 64 defines a bright portion and a dark portion along the transfer direction of the single-faced cardboard sheet D1, based on the captured image captured by the imaging device 233, and compares at least one length of the length of the bright portion and the length the dark portion with a preset determination value. That is, when the medium B1 in the single-faced cardboard sheet D1 is not crushed, for example, the length of the dark portion is longer than the determination value. On the other hand, when the medium B1 in the single-faced cardboard sheet D1 is crushed, for example, the length of the dark portion is shorter than the determination value. That is, when the length of the bright portion or the dark portion imaged by the imaging device 233 is shorter than the determination value, the crushed portion is detected as the mark.

In addition, when the medium B1 in the single-faced cardboard sheet D1 is not crushed, for example, the lengths of the bright portion and the dark portion maintain a constant ratio as the single-faced cardboard sheet D1 is transferred. On the other hand, when the medium B1 in the single-faced cardboard sheet D1 is crushed, the ratio of the lengths of the bright portion and the dark portion is changed. That is, the crushed portion in which the ratio of the lengths of the bright portion and the dark portion imaged by the imaging device 233 is changed is detected as the mark.

[Operation of Paper Splice Part Detection Device of Cardboard Sheet]

Figure 13:
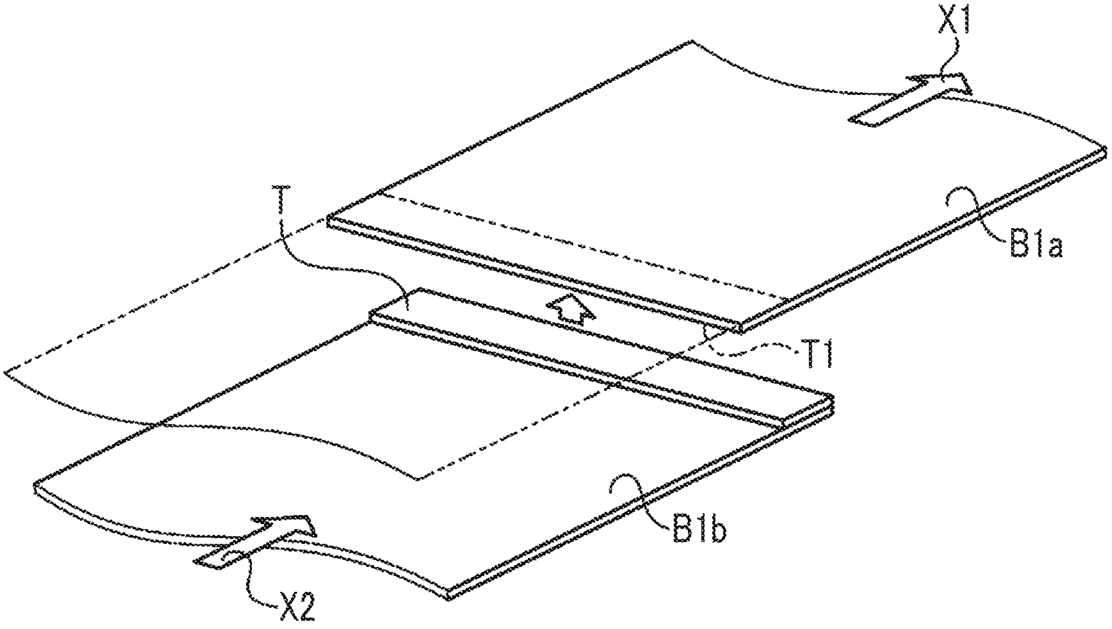
FIG. 13 is a schematic view illustrating a sheet paper splicing method.
Figure 14:
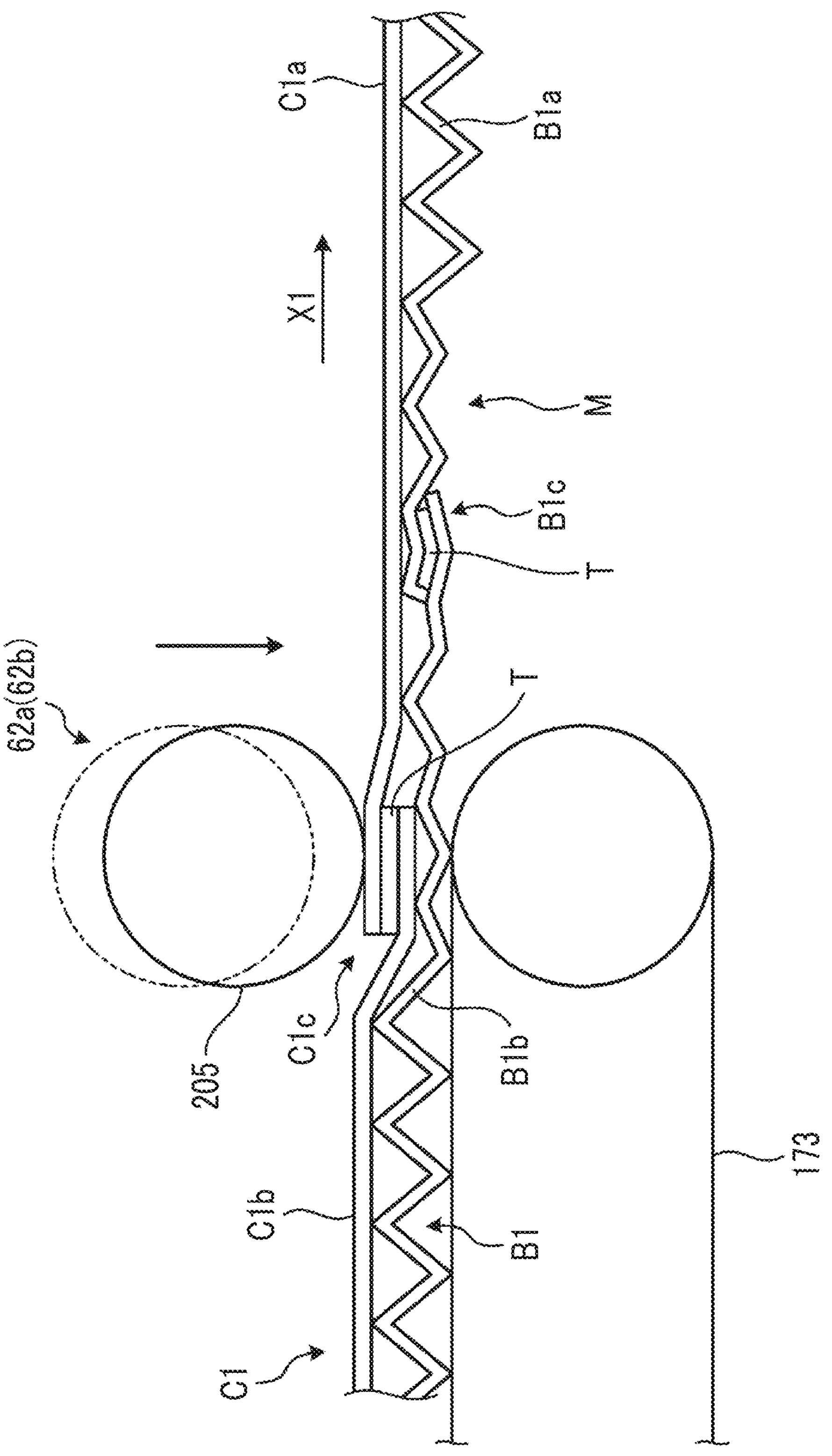
FIG. 14 is a schematic view illustrating a method for assigning a mark to a sheet.
Figure 15:
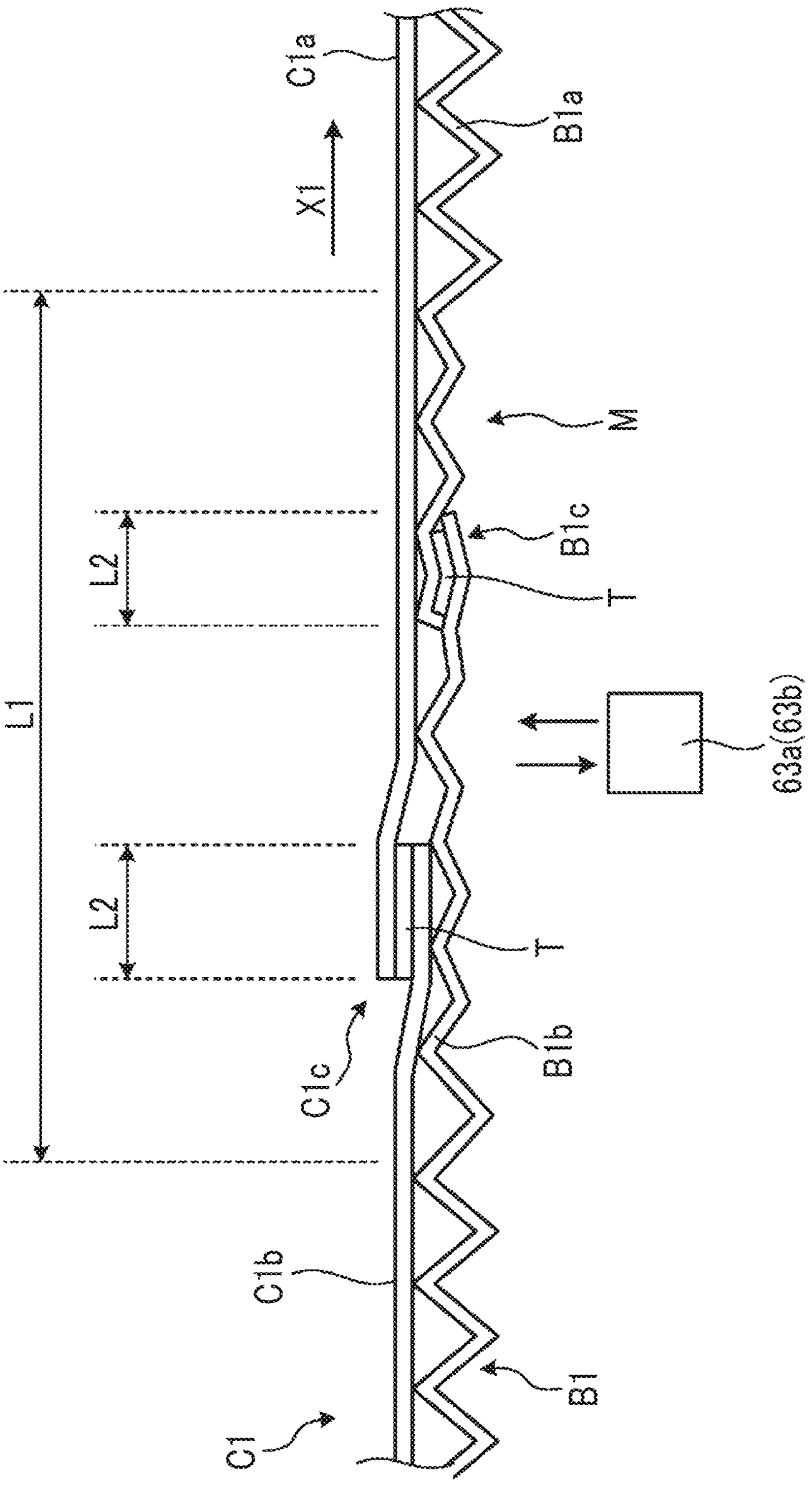
FIG. 15 is a schematic view illustrating a method for detecting the mark in the sheet.

FIG. 13 is a schematic view illustrating a sheet paper splicing method, FIG. 14 is a schematic view illustrating a method for assigning the mark to the sheet, and FIG. 15 is a schematic view illustrating a method for detecting the mark in the sheet.

Here, an operation of the paper splice part detection device 60 of the cardboard sheet will be described. As illustrated in FIGS. 3 and 13, in the mill roll stands 11 and 15, when one roll paper rotates to feed the media B1 and B2 and one roll paper decreases, the other roll paper starts to rotate so that the media B1 and B2 are fed, the splicing is performed by the splicers 31 and 32, and the media B1 and B2 are continuously fed from the mill roll stands 11 and 15. In addition, in the mill roll stands 12 and 16, when one roll paper rotates to feed the top liners C1 and C2 and one roll paper decreases, the other roll paper starts to rotate so that the top liners C1 and C2 are fed, the splicing is performed by the splicers 33 and 34, and the top liners C1 and C2 are continuously fed from the mill roll stands 12 and 6. Furthermore, in the mill roll stand 19, when one roll paper rotates to feed the bottom liner A and one roll paper decreases, the other roll paper starts to rotate so that the bottom liner A is fed, the splicing is performed by the splicer 35, and the bottom liner A is continuously fed from the mill roll stand 19.

In the splicing operation of the medium B1, the leading paper B1*a* of the medium B1 travels along a transfer direction X1, and the trailing paper B1*b* travels along a transfer direction X2 at the same speed. At this time, in the trailing paper B1*b*, a double-faced tape T serving as an adhesive agent is bonded to a surface on a side facing the leading paper B1*a* in the cut tip portion. The crimping bars 106*a* and 106*b* (refer to FIG. 7) are brought close to each other at a predetermined timing, and the leading paper B1*a* and the trailing paper B1*b* are brought into pressurizing contact with each other. In this case, the double-faced tape T of the trailing paper B1*b* is crimped to a bonding portion T1 of the leading paper B1*a*, and the trailing paper B1*b* is connected to the leading paper B1*a*. Simultaneously with this operation, when the leading paper B1*a* is cut by moving the knife 105*a* (refer to FIG. 7) forward, the paper splice part B1*c* (refer to FIG. 14) is formed. The splicing operation is similarly performed on the bottom liner A, the medium B2, and the top liners C1 and C2.

When the splicing is completed by connecting the trailing paper B1*b* to the leading paper B1*a*, the sheet paper splice detection unit 61 detects the paper splice part B1*c* (refer to FIG. 14) of the medium B1. The paper splice parts of the bottom liner A and the top liners C1 and C2 are similarly detected. Thereafter, as illustrated in FIG. 3, after being processed into a corrugated shape, the media B1 and B2 receive the adhesive application in each flute top, and are bonded to the top liners C1 and C2 by the single facers 13 and 17, thereby forming the single-faced cardboard sheets D1 and D2. Then, as illustrated in FIGS. 3 and 14, the marking device 62 assigns the mark M to the paper splice parts B1*c* and C1*c* of the single-faced cardboard sheet D1 by moving the crushing roller 62*a*. That is, when the single-faced cardboard sheet D1 travels along the transfer direction X1, the single-faced cardboard sheet D1 is crushed by moving the crushing roller 62*a* for a predetermined time before a predetermined time required for the paper splice part B1*c* to reach the crushing roller 62*a* after a predetermined time for the paper splice part C1*c* passes through the crushing roller 62*a*. The mark M is similarly assigned to the paper splice part of the single-faced cardboard sheet D2.

After the bottom liner A and the single-faced cardboard sheets D1 and D2 are heated by the preheater 20, the mark detection device 63 detects the marks M assigned to the single-faced cardboard sheets D1 and D2. That is, as illustrated in FIGS. 3 and 15, the mark detector 63*a* (63*b*) detects the mark M assigned to the traveling single-faced cardboard sheet D1 (D2). Thereafter, the bottom liner A and the single-faced cardboard sheet D1 (D2) are bonded by the double facer 22 to form the double-faced cardboard sheet E. The double-faced cardboard sheet E is cut into a predetermined width by the slitter scorer 24, and is cut to a predetermined length by the cutoff 25 to form the double-faced cardboard sheet F.

As illustrated in FIGS. 2 and 8, the control device 64 controls an operation timing of the defective sheet rejecting device 26, based on position information of each mark M of the media B1 and B2 and the top liners C1 and C2 which is detected by the mark detection device 63. That is, the control device 64 calculates a time at which each mark M of the media B1 and B2 and the top liners C1 and C2 reaches the defective sheet rejecting device 26, operates the defective sheet rejecting device 26 at the time at which each mark M reaches the defective sheet rejecting device 26, and removes the double-faced cardboard sheet F having the mark M (paper splice part) from the transfer line. In addition, the control device 64 controls the operation timing of the defective sheet rejecting device 26, based on position information of the paper splice part of the bottom liner A which is detected by the sheet paper splice detection unit 61. That is, the control device 64 calculates a time at which the paper splice part of the bottom liner A reaches the defective sheet rejecting device 26, operates the defective sheet rejecting device 26 at the time at which the paper splice part reaches the defective sheet rejecting device 26, and removes the double-faced cardboard sheet F having the paper splice part B1*c* from the transfer line.

The control device 64 determines the double-faced cardboard sheet F having a length region L1 having the existing mark M including a length region L2 having the existing paper splice part, as a defective sheet, and operates the defective sheet rejecting device 26 to operate the defective sheet rejecting device 26 to remove the defective sheet from the transfer line.

In addition, the control device 64 measures a bridge stagnation quantity of the single-faced cardboard sheets D1 and D2, based on a timing at which the sheet paper splice detection unit 61 detects the paper splice parts of the media B1 and B2 and the top liners C1 and C2 and a timing at which the mark detection device 63 detects the mark M at a predetermined position upstream of the double facer 22.

As illustrated in FIG. 2, the control device 64 includes a bridge stagnation quantity measurement unit 70. A detection signal indicating that the sheet paper splice detection unit 61 detects the paper splice parts of the media B1 and B2 and the top liners C1 and C2 is input to the bridge stagnation quantity measurement unit 70. In addition, a detection signal indicating that the mark detection device 63 detects the mark M is input to the bridge stagnation quantity measurement unit 70. The bridge stagnation quantity measurement unit 70 can calculate the length of the bridge stagnation quantity of the single-faced cardboard sheets D1 and D2 from the sheet paper splice detection unit 61 to the mark detection device 63, based on a time from a timing at which the detection signal of the paper splice part is input to a timing at which the detection signal of the mark M is input, and a production speed of the single-faced cardboard sheets D1 and D2 of the single facers 13 and 17.

The control device 64 controls a splicing timing of the bottom liner A, based on the bridge stagnation quantity of the single-faced cardboard sheets D1 and D2. When a type of the cardboard sheet to be manufactured is changed, types of the media B1 and B2, the top liners C1 and C2, and the bottom liner A are changed. At this time, based on the bridge stagnation quantity of the single-faced cardboard sheets D1 and D2, the control device 64 calculates a timing at which the paper splice parts existing in the single-faced cardboard sheets D1 and D2 (paper splice parts of the media B1 and B2 and paper splice parts of the top liners C1 and C2) reach the double facer 22. In addition, based on a timing at which the paper splice parts existing in the single-faced cardboard sheets D1 and D2 reach the double facer 22, the control device 64 controls a splicing timing of the bottom liner A so that the paper splice part of the bottom liner A coincides with the paper splice parts existing in the single-faced cardboard sheets D1 and D2 in the transfer direction.

Figure 16:
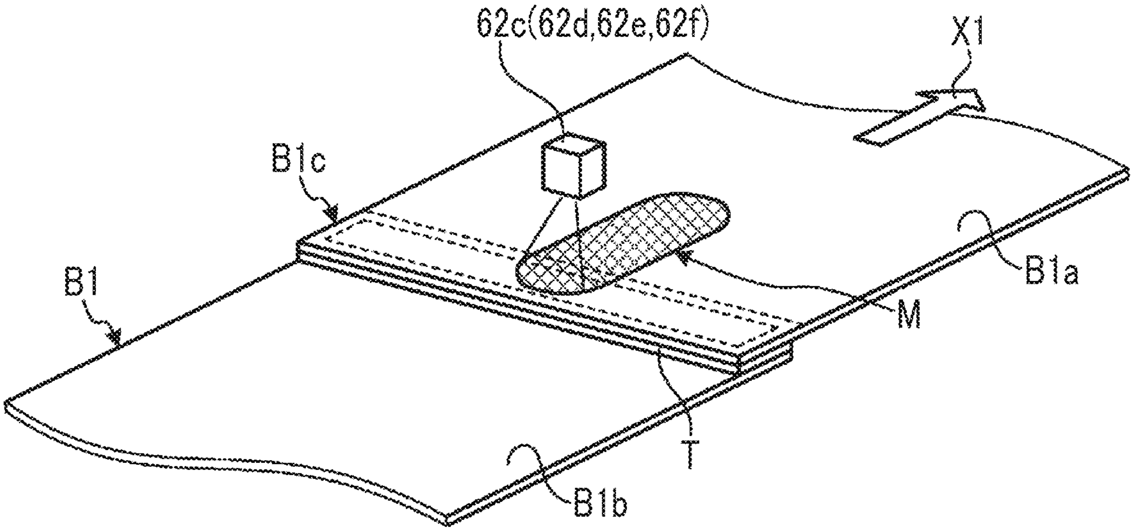
FIG. 16 is a schematic view illustrating a modification example of the method for assigning the mark to the sheet.
Figure 17:
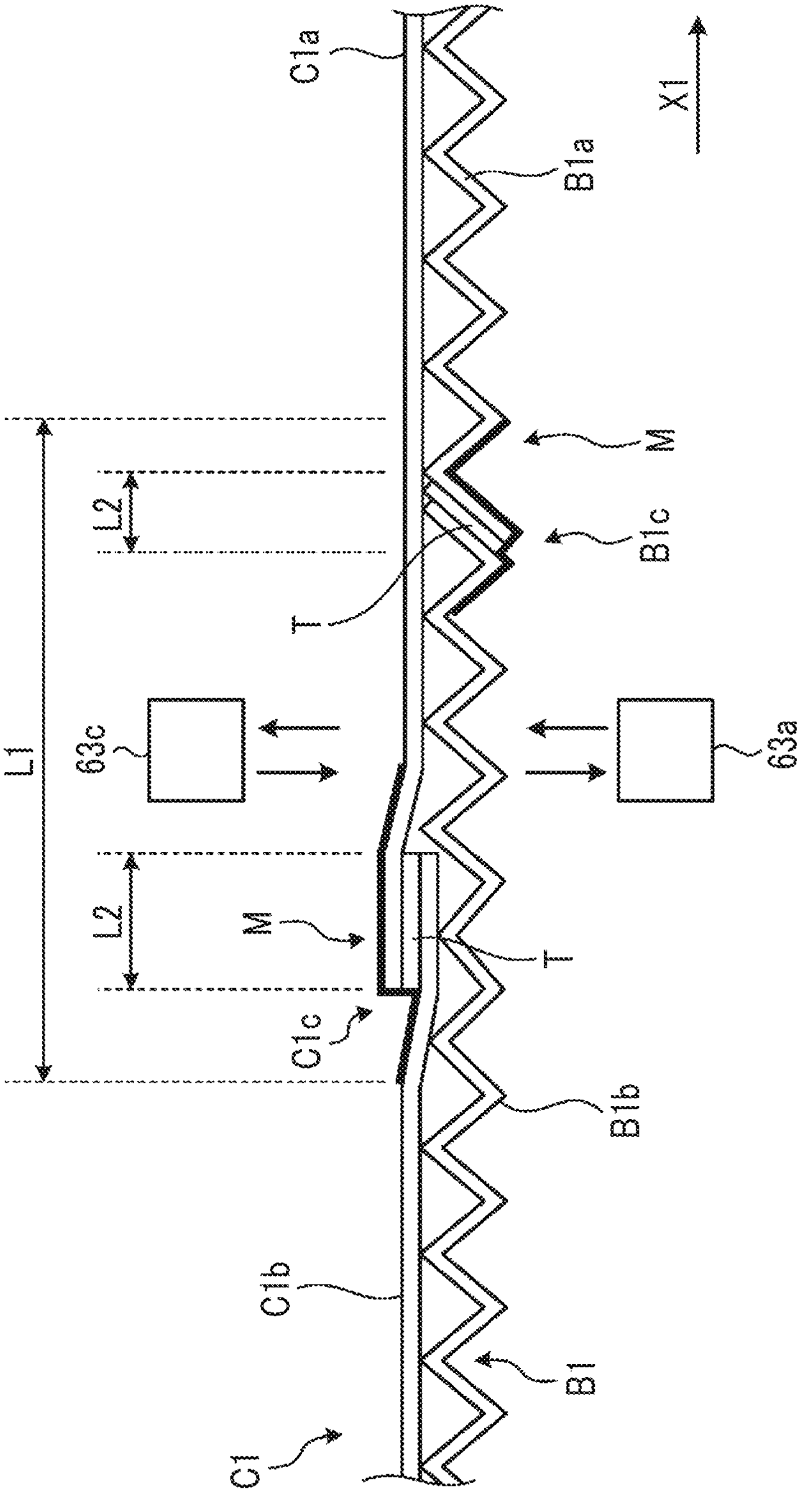
FIG. 17 is a schematic view illustrating a modification example of the method for detecting the mark in the sheet.

FIG. 16 is a schematic view illustrating a modification example of a method for assigning the mark to the sheet, and FIG. 17 is a schematic view illustrating a modification example of a method for detecting the mark in the sheet.

As illustrated in FIGS. 3 and 16, when the splicing is completed by connecting the trailing paper B1*b* to the leading paper B1*a*, the sheet paper splice detection unit 61 detects the paper splice part B1*c* of the medium B1. The paper splice parts of the medium B2, the bottom liner A, and the top liners C1 and C2 are similarly detected. Then, the spray nozzle 62*c* of the marking device 62 assigns the mark M to the paper splice part B1*c* of the medium B1. That is, when the medium B1 travels along the transfer direction X1, the spray nozzle 62*c* ejects the ink for a predetermined time before a predetermined time required for the paper splice part B1*c* to reach the spray nozzle 62*c* after a predetermined time required for the paper splice part B1*c* to pass through the spray nozzle 62*c*. The mark M is similarly assigned to the paper splice parts of the medium B2 and the top liners C1 and C2.

Thereafter, the media B1 and B2 receive the adhesive application in each flute top after being processed into a corrugated shape, and are bonded to the top liners C1 and C2 by the single facers 13 and 17, thereby forming the single-faced cardboard sheets D1 and D2. After the bottom liner A and the single-faced cardboard sheets D1 and D2 are heated by the preheater 20, the mark detection device 63 detects the marks M assigned to the single-faced cardboard sheets D1 and D2. In this case, the mark detection device 63 detects the mark M assigned by the spray nozzles 62*c* and 62*e* (62*d* and

62*f*). Therefore, for example, the mark detectors 63*a* and 63*c* (63*b* and 63*d*) are configured to include a camera for imaging the mark M or a color sensor for detecting a color of the ink of the mark M. That is, as illustrated in FIGS. 3 and 17, the mark detectors 63*a* and 63*c* (63*b* and 63*d*) detect the mark M assigned to the traveling single-faced cardboard sheet D1 (D2) by the spray nozzles 62*c* and 62*e* (62*d* and 62*f*). In this case, the mark detector 63*a* detects the mark M assigned to the medium B1 in the traveling single-faced cardboard sheet D1, and the mark detector 63*c* detects the mark M assigned to the top liner C1 in the traveling single-faced cardboard sheet D1. Thereafter, the bottom liner A and the single-faced cardboard sheet D1 (D2) are bonded by the double facer 22 to form the double-faced cardboard sheet E. The double-faced cardboard sheet E is cut into a predetermined width by the slitter scorer 24, and is cut to a predetermined length by the cutoff 25 to form the double-faced cardboard sheet F.

Operational Effects of Present Embodiment

The paper splice part detection device of the cardboard sheet according to a first aspect includes sheet paper splice detection unit 61 disposed between the sheet paper splicing position and the sheet bonding position in the sheet transfer direction and detecting the sheet paper splice part, based on the shapes of the bottom liner (first sheet) A, the media (second sheet) B1 and B2, and the top liners (third sheet) C1 and C2, the marking device 62 that assigns the mark to the sheet paper splice part on the downstream side in the sheet transfer direction from the sheet paper splice detection unit 61, and the mark detection device 63 that detects the mark on the downstream side in the sheet transfer direction from the marking device 62.

According to the paper splice part detection device of the cardboard sheet in the first aspect, the sheet paper splice part is detected, and the mark is assigned, based on the shapes of the bottom liner A, the media B1 and B2, and the top liners C1 and C2. The mark is detected to detect the sheet paper splice part. Therefore, it is possible to improve accuracy in detecting the sheet paper splice part of the cardboard sheet without using a metal plate such as aluminum.

In the paper splice part detection device of a cardboard sheet according to a second aspect, the sheet paper splice detection unit 61 detects the sheet paper splice part, based on the sheet thickness. In this manner, the paper splice parts of the bottom liner A, the media B1 and B2, and the top liners C1 and C2 can be highly accurately detected.

In the paper splice part detection device of the cardboard sheet according to a third aspect, the sheet paper splice detection unit 61 is disposed between the dancer roll 109 of the splicers (sheet paper splicing devices) 31, 32, 33, 34, and 35 and the preheating rolls 131 and 133 of the single facers (sheet bonding devices) 13 and 17 forming the single-faced cardboard sheets D1 and D2. In this manner, a sheet thickness direction, a sheet width direction, and a sheet transfer angle hardly fluctuate in the media B1 and B2 and the top liners C1 and C2 to be transferred to the dancer roll 109 and the preheating rolls 131 and 133. A distance between the sheet paper splice detection unit 61 and the media B1 and B2 and the top liners C1 and C2 hardly fluctuates. Therefore, the paper splice part can be highly accurately detected. In addition, the media B1 and B2 and the top liners C1 and C2 before the bonding hardly expand and contract. Therefore, the paper splice part can be highly accurately detected.

In the paper splice part detection device of the cardboard sheet according to a fourth aspect, the marking device 62 is disposed between the preheating rolls 131 and 133 of the single facers 13 and 17 forming the single-faced cardboard sheet D1 and D2 and the upper corrugating roll 124 and the lower corrugating roll 125. In this manner, the marks can be properly assigned to the media B1 and B2 and the top liners C1 and C2.

In the paper splice part detection device of the cardboard sheet according to a fifth aspect, the marking device 62 is disposed on the downstream side in the sheet transfer direction from the single facers 13 and 17 forming the single-faced cardboard sheet D1 and D2. In this manner, the number of marking devices 62 can be reduced, and the device can be simplified.

In the paper splice part detection device of the cardboard sheet according to a sixth aspect, the mark detection device 63 is disposed on the downstream side in the transfer direction from the bridges 14 and 18 where the single-faced cardboard sheet D1 and D2 stagnate. In this manner, the mark can be highly accurately assigned to the media B1 and B2 and the top liners C1 and C2.

The cardboard sheet-manufacturing apparatus according to a seventh aspect includes splicers 31, 32, 33, 34, and 35 that splice the leading sheet and the trailing sheet in the bottom liner A, the media B1 and B2, and the top liners C1 and C2, the single facers 13 and 17 that manufacture the single-faced cardboard sheet D by bonding the top liners C1 and C2 to the corrugated media B1 and B2, the double facer 22 that manufactures the double-faced cardboard sheet E by bonding the bottom liner A to the media B1 and B2 sides in the single-faced cardboard sheets D1 and D2 manufactured by the single facers 13 and 17, the paper splice part detection device 60 of the cardboard sheet, and the defective sheet rejecting device 26 for the cardboard sheet. In this manner, the sheet paper splice part is detected to assign the mark, based on the shapes of the bottom liner A, the media B1 and B2, and the top liner. The mark is detected to detect the sheet paper splice part. Therefore, it is possible to improve accuracy in detecting the paper splice part of the cardboard sheet without using the metal plate such as aluminum.

The cardboard sheet-manufacturing apparatus according to an eighth aspect includes splicers 31, 32, 33, 34, and 35 that splice the leading sheet and the trailing sheet in the bottom liner A, the medium B1, B2, and the top liners C1 and C2, the single facers 13 and 17 that manufacture the single-faced cardboard sheets D by bonding the top liners C1 and C2 to the corrugated media B1 and B2, the double facer 22 that manufactures the double-faced cardboard sheet E by bonding the bottom liner A to the media B1 and B2 sides in the single-faced cardboard sheets D1 and D2 manufactured by the single facers 13 and 17, the paper splice part detection device 60 of the cardboard sheet, and the bridge stagnation quantity measurement unit 70 that measures the stagnation quantity of the single-faced cardboard sheets D1 and D2, based on the paper splice part. In this manner, the stagnation quantity of the single-faced cardboard sheets D1 and D2 can be highly accurately measured.

In the above-described embodiment, the marking device 62 is the crushing roller or the spray nozzle. However, the present invention is not limited to this configuration. For example, the marking device 62 may be an inkjet head, an application roller, an application brush, a stamp, or a moisture assigning device. In addition, when the marking device 62 is the moisture assigning device, the mark detection device 63 may cause a moisture detector to detect moisture of the bottom liners A, the media B1 and B2, the top liners C1 and C2, and the single-faced cardboard sheets D1 and D2.

REFERENCE SIGNS LIST

10: corrugating machine (cardboard sheet-manufacturing apparatus)
11, 12, 15, 16, 19: mill roll stand
13, 17: single facer (sheet bonding device)
14, 18: bridge
20: preheater
21: glue machine
22: double facer (sheet bonding device)
23: rotary shear
24: slitter scorer
25: cutoff
26: defective sheet rejecting device (sheet removal device)
27: stacker
28, 29: take up conveyor
30: paper guide device
31, 32, 33, 34, 35: splicer (sheet paper splicing device)
41, 42, 43: preheating roll
44, 45: adhesive applicator roll
60: paper splice part detection device of cardboard sheet
61: sheet paper splice detection unit
61*a*, 61*b*, 61*c*, 61*d*, 61*e*: ultrasonic sensor
62: marking device
62*a*, 62*b*: crushing roller
62*c*, 62*d*, 62*e*, 62*f*: spray nozzle
63: mark detection device
63*a*, 63*b*, 63*c*, 63*d*: mark detector
64: control device
70: bridge stagnation quantity measurement unit
A: bottom liner (first sheet)
B1, B2: medium (second sheet)
C1, C2: top liner (third sheet)
D, D1, D2: single-faced cardboard sheet
E, F: double-faced cardboard sheet
M: mark

The invention claimed is:

1. A paper splice part detection device of a cardboard sheet, which detects a sheet paper splice part in a cardboard sheet in which a first sheet, a corrugated second sheet, and a third sheet are bonded, the device comprising:

a sheet paper splice detection unit disposed between a sheet paper splicing position and a sheet bonding position in a sheet transfer direction and detecting the sheet paper splice part, based on a shape of the sheet;

a marking device that includes a crushing roller and is configured to assign a mark using the crushing roller to the sheet paper splice part on a downstream side in the sheet transfer direction from the sheet paper splice detection unit; and a mark detection device that detects the mark formed by the marking device on the cardboard sheet on the downstream side in the sheet transfer direction from the marking device, wherein the sheet paper splice detection unit is disposed between a dancer roll of a sheet paper splicing device and a preheater located upstream of a sheet bonding device forming a single-faced cardboard sheet laminates sheet.

2. The paper splice part detection device of a cardboard sheet according to claim 1, wherein the sheet paper splice detection unit detects the sheet paper splice part, based on a sheet thickness.

3. The paper splice part detection device of a cardboard sheet according to claim 1, wherein the marking device is disposed between a preheater of a sheet bonding device forming a single-faced cardboard sheet and a corrugating roll.

4. The paper splice part detection device of a cardboard sheet according to claim 1, wherein the marking device is disposed on the downstream side in the sheet transfer direction from a sheet bonding device forming a single-faced cardboard sheet.

5. The paper splice part detection device of a cardboard sheet according to claim 1, wherein the mark detection device is disposed on the downstream side in the transfer direction from a bridge in which the single-faced cardboard sheet stagnates.

* * * * *